United States Patent
Park et al.

(10) Patent No.: US 12,411,524 B2
(45) Date of Patent: Sep. 9, 2025

(54) ELECTRONIC DEVICE INCLUDING STRUCTURE FOR SUPPORTING DISPLAY

(71) Applicant: SAMSUNG ELECTRONICS CO., LTD., Suwon-si (KR)

(72) Inventors: Byounggyu Park, Suwon-si (KR); Taejeong Kim, Suwon-si (KR); Garam Lee, Suwon-si (KR); Kidoc Son, Suwon-si (KR); Kyunghwan Song, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/217,092

(22) Filed: Jun. 30, 2023

(65) Prior Publication Data

US 2023/0403807 A1  Dec. 14, 2023

Related U.S. Application Data

(63) Continuation of application No. PCT/KR2023/005181, filed on Apr. 17, 2023.

(30) Foreign Application Priority Data

Jun. 8, 2022 (KR) .................. 10-2022-0069612
Aug. 11, 2022 (KR) .................. 10-2022-0100979

(51) Int. Cl.
*G06F 1/16* (2006.01)
(52) U.S. Cl.
CPC .................. *G06F 1/1652* (2013.01)
(58) Field of Classification Search
CPC .................................... G06F 1/1652
See application file for complete search history.

(56) References Cited

U.S. PATENT DOCUMENTS

| 10,194,543 B2 | 1/2019 | Seo et al. |
| 11,012,546 B1 | 5/2021 | Song et al. |

(Continued)

FOREIGN PATENT DOCUMENTS

| CN | 111862824 A | 10/2020 |
| CN | 113362712 A | 9/2021 |

(Continued)

OTHER PUBLICATIONS

International Search Report (PCT/ISA/210) issued on Aug. 4, 2023 by the International Searching Authority in International Patent Application No. PCT/KR2023/005181.

(Continued)

*Primary Examiner* — James Wu
(74) *Attorney, Agent, or Firm* — Sughrue Mion, PLLC

(57) ABSTRACT

An electronic device according to an embodiment includes a first housing, a second housing coupled to the first housing so as to be slidable with respect to the first housing, a display including a planar region and a deformable region in contact with the planar region, and a support plate configured to supporting the display. The support plate includes rigid regions and a flexible region disposed between the rigid regions and including a plurality of openings. The support plate further includes a first layer including a plurality of first openings in the flexible region, and a second layer disposed on the first layer and including a plurality of second openings partially overlapping each of the plurality of first openings in the flexible region. Other embodiments are also possible.

20 Claims, 26 Drawing Sheets

(56) References Cited

U.S. PATENT DOCUMENTS

| | | | |
|---|---|---|---|
| 11,031,563 B1* | 6/2021 | Li | H10K 77/111 |
| 11,094,898 B2 | 8/2021 | Cao et al. | |
| 11,343,364 B2 | 5/2022 | Cha et al. | |
| 11,497,130 B2* | 11/2022 | Song | G06F 1/1652 |
| 12,033,545 B2 | 7/2024 | Ahn et al. | |
| 12,259,756 B2* | 3/2025 | Zhou | G06F 1/1616 |
| 2016/0070304 A1* | 3/2016 | Shin | G02F 1/133305 |
| | | | 361/679.26 |
| 2022/0087040 A1 | 3/2022 | Song et al. | |
| 2022/0132680 A1 | 4/2022 | Liu et al. | |
| 2022/0253103 A1 | 8/2022 | Choi et al. | |
| 2023/0176621 A1 | 6/2023 | Zhou et al. | |
| 2023/0199980 A1 | 6/2023 | Jiang | |

FOREIGN PATENT DOCUMENTS

| | | |
|---|---|---|
| CN | 214587744 U | 11/2021 |
| KR | 10-2018-0040181 A | 4/2018 |
| KR | 10-2019-0003257 A | 1/2019 |
| KR | 10-2021-0081485 A | 7/2021 |
| KR | 10-2022-0008732 A | 1/2022 |
| KR | 10-2022-0014807 A | 2/2022 |
| KR | 10-2022-0035089 A | 3/2022 |
| KR | 10-2392468 B1 | 4/2022 |
| WO | 2019/218584 A1 | 11/2019 |
| WO | 2021/206190 A1 | 10/2021 |
| WO | 2021/246561 A1 | 12/2021 |
| WO | 2022/000598 A1 | 1/2022 |
| WO | 2022/042036 A1 | 3/2022 |

OTHER PUBLICATIONS

Written Opinion (PCT/ISA/237) issued on Aug. 4, 2023 by the International Searching Authority in International Patent Application No. PCT/KR2023/005181.

Communication issued Jul. 1, 2025 by the European Patent Office in European Patent Application No. 23819979.8.

* cited by examiner

ELECTRONIC DEVICE INCLUDING STRUCTURE FOR SUPPORTING DISPLAY

CROSS-REFERENCE TO RELATED APPLICATION

This application is a by-pass continuation application of International Application No. PCT/KR2023/005181, filed on Apr. 17, 2023, which is based on and claims priority to Korean Patent Application No. 10-2022-0069612, filed on Jun. 8, 2022, and Korean Patent Application No. 10-2022-0100979, filed on Aug. 11, 2022, in the Korean Intellectual Property Office, the disclosures of which are incorporated by reference herein in their entireties.

BACKGROUND

1. Field

The disclosure relates to an electronic device including structure for supporting a display.

2. Description of Related Art

In order for a user to easily carry electronic devices, electronic devices are required to be miniaturized. Notwithstanding such miniaturization of these electronic devices, there is still an increasing need for an electronic device in which a screen size of a display for displaying contents may be changed so that the user can utilize various contents through the electronic device. For example, the electronic device may include a flexible display with a changeable screen size of the display being exposed to the outside of the electronic device.

SUMMARY

In a flexible display of an electronic device, for example, the area of the display may be expanded or reduced according to movement of a housing. In order to reinforce rigidity of the display of which area varies according to the movement of the housing, the electronic device may include a structure capable of supporting the display in the housing. When the thickness of the supporting structure is designed to increase with a view to reinforcing the rigidity of the display, the thickness of the housing may also unnecessarily increase. Thus, the electronic device may need to optimize the supporting structure of the display in the electronic device.

The technical problems to be addressed in this disclosure are not limited to those described above, and other technical problems not mentioned herein will be clearly understood by those having ordinary knowledge in the technical field to which the present disclosure belongs, from the following description.

According to an embodiment, an electronic device includes a first housing, a second housing coupled to the first housing so as to be slidable with respect to the first housing in a first direction and a second direction opposite to the first direction, a display including a planar region disposed on the second housing and a deformable region in contact with the planar region, the deformable region being exposed to an outside as the second housing moves in the first direction or disposed in the first housing as the second housing moves in the second direction, and a support plate supporting the display. According to an embodiment, the support plate includes rigid regions, a flexible region disposed between the rigid regions and including a plurality of openings spaced apart from each other and having a length in a third direction perpendicular to the first direction, a first layer including a plurality of first openings extending in the third direction in the flexible region, and a second layer disposed on the first layer and including a plurality of second openings partially overlapping each of the plurality of first openings in the flexible region. According to an embodiment, a distance from one end to the other end of one first opening of the plurality of first openings facing the third direction is different from a distance from the one end of the one first opening to one end of both ends of one second opening of the plurality of second openings overlapping the one first opening, the one second opening being near to the other end of the one first opening.

According to an embodiment, an electronic device includes a first housing, a second housing coupled to the first housing so as to be slidable with respect to the first housing in a first direction and a second direction opposite to the first direction, a display including a planar region disposed on the second housing and a deformable region in contact with the planar region, the deformable region being exposed to an outside as the second housing moves in the first direction or disposed in the first housing as the second housing moves in the second direction, a support plate supporting the display, at least one gear head disposed on both peripheries of the support plate extending in a direction parallel to the first direction, and a guide gear guiding movement of the display and rotating as meshed with the at least one gear. According to an embodiment, the support plate includes rigid regions, a flexible region disposed between the rigid regions, the flexible region including a plurality of openings spaced apart from each other and having a length in a third direction perpendicular to the first direction, a first layer including a plurality of first openings extending in the third direction and a plurality of first bridges separating each of the plurality of first openings in the flexible region, and a second layer disposed on the first layer and including a plurality of second openings partially overlapping each of the plurality of first openings and a plurality of second bridges separating each of the plurality of second openings in the flexible region. According to an embodiment, a distance from one end of one first opening of the plurality of first openings facing the third direction to one first bridge of the plurality of first bridges in contact with another end of the one first opening may be different from a distance from the one end of the one first opening to a second bridge of the plurality of second bridges, the second bridge being near to the another end of the first opening.

An electronic device according to an embodiment, a support plate including a plurality of layers may be disposed onto at least part of a display, thereby reinforcing the display and then providing enough space for other components in the electronic device.

The effects that can be obtained from the disclosure are not limited to those described above, and any other effects not mentioned herein will be clearly understood by those having ordinary knowledge in the technical field to which the disclosure belongs, from the following description.

DETAILED DESCRIPTION

Figure 1:
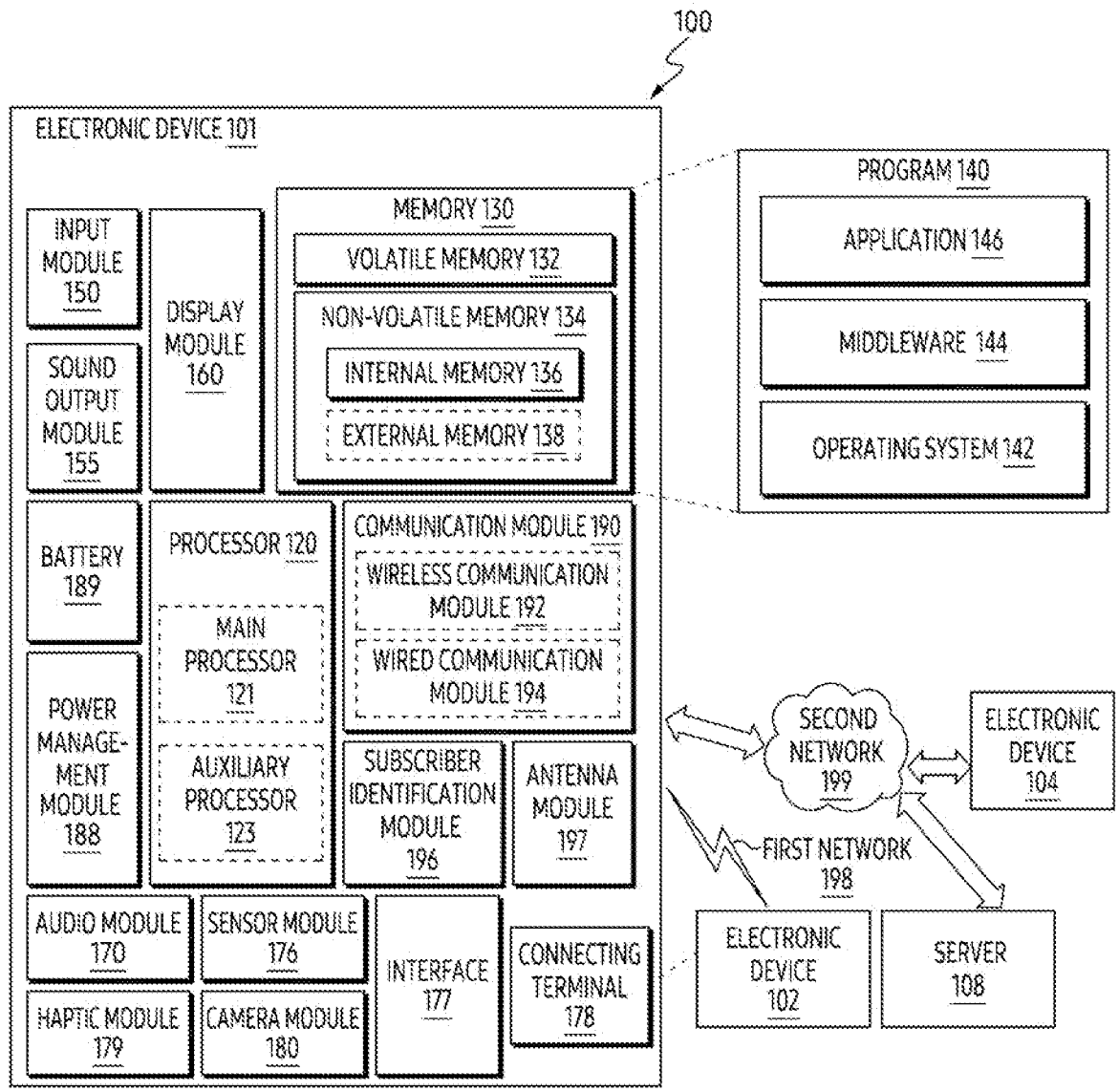
FIG. 1 is a block diagram illustrating an electronic device in a network environment according to various embodiments.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-Things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
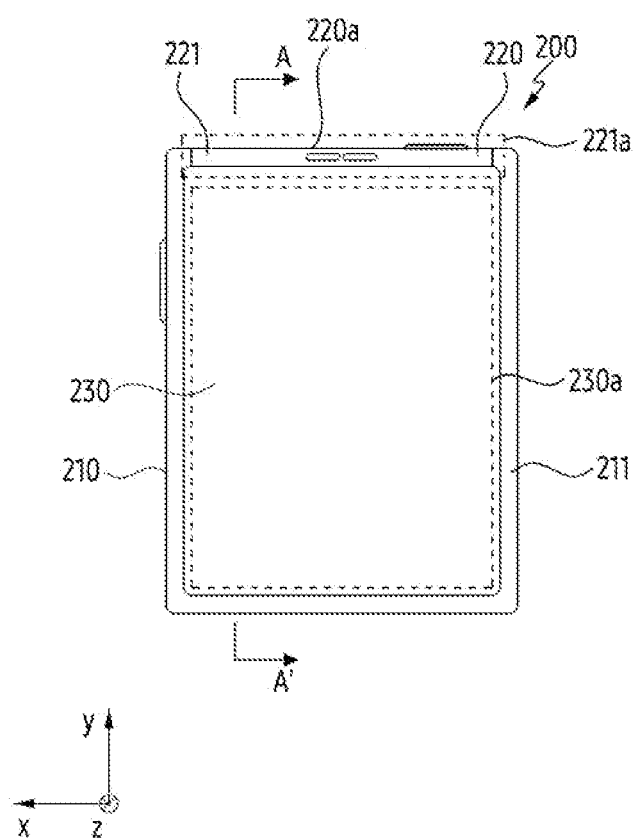
FIG. 2A is a front view illustrating a first state of an electronic device according to an embodiment.
Figure 2B:
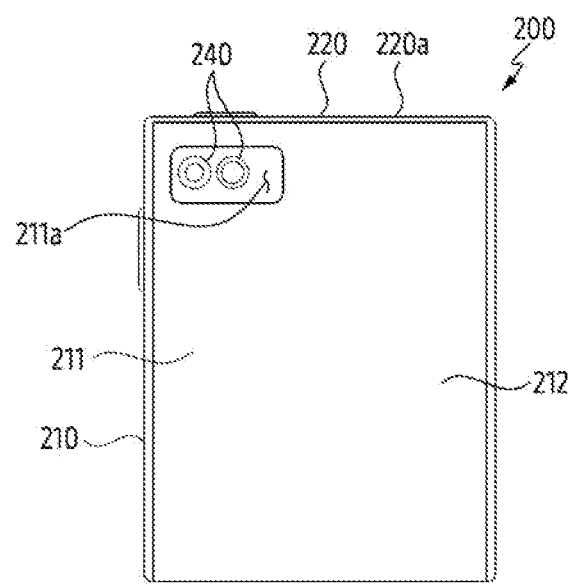
FIG. 2B is a rear view illustrating a first state of an electronic device according to an embodiment.
Figure 2C:
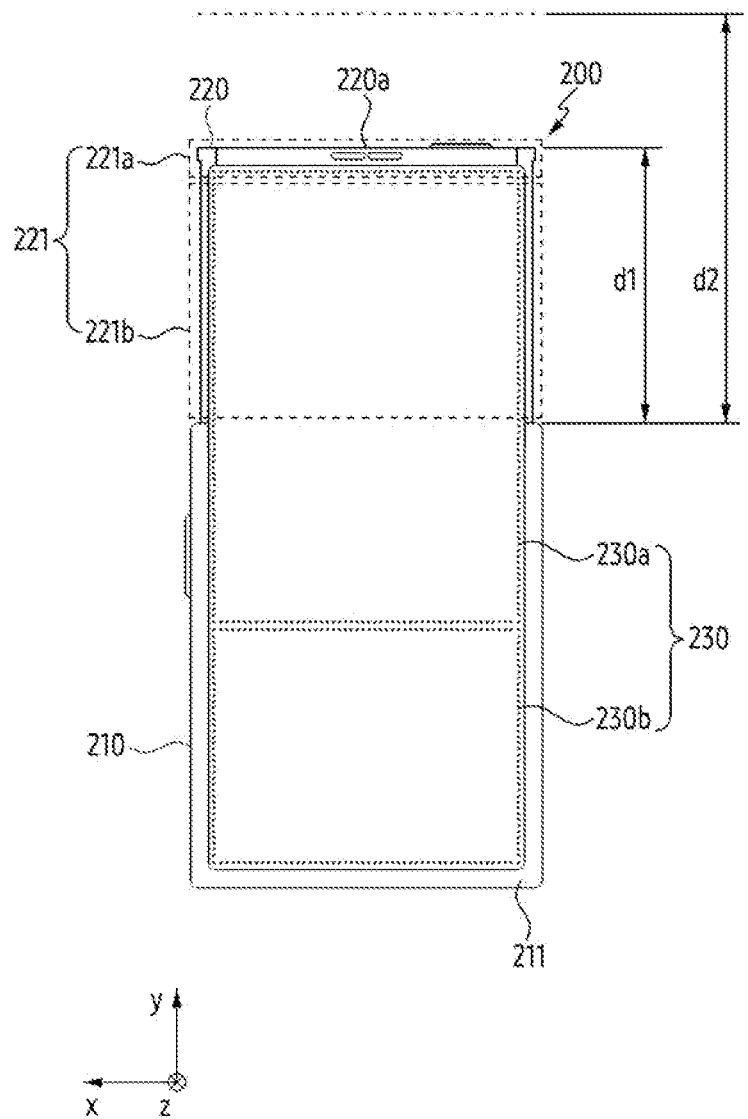
FIG. 2C is a front view illustrating a second state of an electronic device according to an embodiment.
Figure 2D:
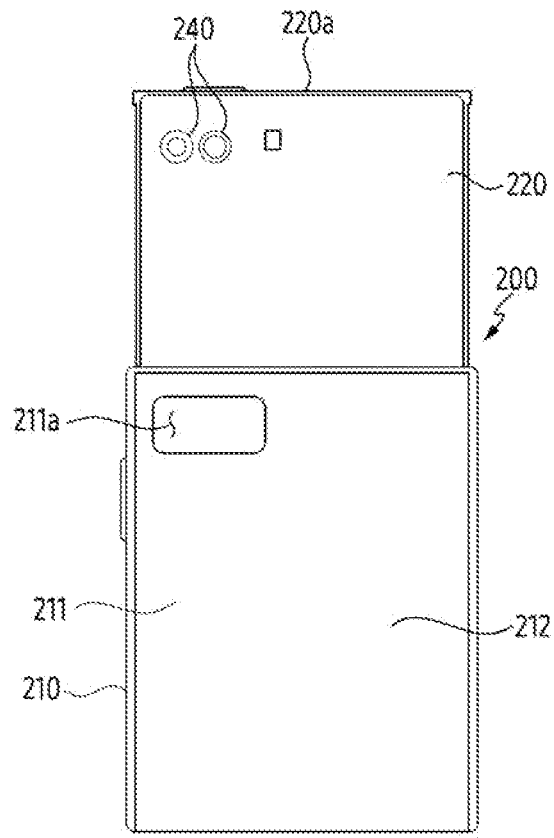
FIG. 2D is a rear view illustrating a second state of an electronic device according to an embodiment.

FIG. 2A is a front view of an electronic device in a first state according to an embodiment, FIG. 2B is a rear view of the first state of the electronic device according to an embodiment, FIG. 2C is a front view of a second state of the electronic device according to an embodiment, and FIG. 2D is a rear view of the second state of the electronic device according to an embodiment.

Referring to FIGS. 2A, 2B, 2C, and 2D, an electronic device 200 (e.g., the electronic device 101 of FIG. 1) according to an embodiment may include a first housing 210, a second housing 220, a display 230 (e.g., the display module 160 of FIG. 1), and a camera 240 (e.g., the camera module 180 of FIG. 1). According to an embodiment, the second housing 220 may be slidable with respect to the first housing 210. For example, the second housing 220 may move within a range of a specified distance along a first direction (e.g., +y direction) with respect to the first housing 210. When the second housing 220 moves in the first direction, a distance between a side surface 220a of the second housing 220 facing the first direction and the first housing 210 may increase. For another example, the second housing 220 may move within a range of a specified distance along a second direction (e.g., −y direction) opposite to the first direction with respect to the first housing 210. When the second housing 220 moves in the second direction, the distance between the side surface 220a of the second housing 220 facing the first direction and the first housing 210 may decrease. According to an embodiment, the second housing 220 may linearly reciprocate with respect to the first housing 210 while sliding relative to the first housing 210. For example, at least a portion of the second housing 220 may be slidable into the first housing 210 or slidable out from the first housing 210.

According to an embodiment, the electronic device 200 may be referred to as a "slidable electronic device", as the second housing 220 is designed to be slidable with respect to the first housing 210. According to an embodiment, the electronic device 200 may be referred to as a "rollable electronic device", as at least a portion of the display 230 is designed to be rolled up into the second housing 220 (or the first housing 210) based on a sliding movement of the second housing 220.

According to an embodiment, the first state of the electronic device 200 may be defined as a state in which the second housing 220 is moved in the second direction (e.g., a contracted state or a slide-in state). For example, in the first state of the electronic device 200, the second housing 220 may be movable in the first direction, but may not be movable in the second direction. In the first state of the electronic device 200, the distance between the side surface 220a of the second housing 220 and the first housing 210 may increase as the second housing 220 moves, but it may not decrease any more. For another example, in the first state of the electronic device 200, a portion of the second housing 220 may be slidable-out from the first housing 210, but it may not be slidable-in anymore. According to an embodiment, the first state of the electronic device 200 may be defined as a state in which a second region 230b of the display 230 is not visually exposed from the outside of the electronic device 200. For example, in the first state of the electronic device 200, the second region 230b of the display 230 may located in an internal space of the electronic device 200 formed by the first housing 210 and/or the second housing 220, so that it is not visible from the outside of the electronic device 200.

According to an embodiment, the second state of the electronic device 200 may be defined as a state in which the second housing 220 is moved in the first direction (e.g., an extended state or a slide-out state). For example, in the second state of the electronic device 200, the second housing 220 may be movable in the second direction, but may not be movable in the first direction anymore. In the second state of the electronic device 200, the distance between the side surface 220a of the second housing 220 and the first housing 210 may decrease as the second housing 220 moves, but it may not increase further. For another example, in the second state of the electronic device 200, a portion of the second housing 220 may be slidable into the first housing 210, but it may not be slidable out from the first housing 210 further. According to an embodiment, the second state of the electronic device 200 may be defined as a state in which the second region 230b of the display 230 is visually exposed from the outside of the electronic device 200. For example, in the second state of the electronic device 200, the second region 230b of the display 230 may be drawn out from the internal space of the electronic device 200 so that it visible from the outside of the electronic device 200.

According to an embodiment, when the second housing 220 moves from the first housing 210 in the first direction, at least a portion of the second housing 220 and/or the second region 230b of the display 230 may be draw out from the first housing 210 by a pull-out length d1 corresponding to the moving distance of the second housing 220. According to an embodiment, the second housing 220 may reciprocate within a specified distance d2. According to an embodiment, the pull-out length d1 may have substantially a dimension ranging from zero to the specified distance d2.

According to an embodiment, the state of the electronic device 200 may be convertible between the second state and/or the first state, with either a manual operation by a user or an automatic operation by a driving module arranged inside the first housing 210 or the second housing 220. According to an embodiment, the driving module may trigger a certain operation based on a user input. According to an embodiment, the user input for triggering the operation of the driving module may include a touch input through the display 230, a force touch input, and/or a gesture input. According to another embodiment, the user input for triggering the operation of the driving module may include a voice input or an input of a physical button exposed to the outside of the first housing 210 or the second housing 220.

According to an embodiment, the driving module may be configured to be driven in a semi-automatic manner in which an operation is triggered upon detection of such a manual operation using a user's physical force.

According to an embodiment, the first state of the electronic device 200 may be referred to as a "first shape", and the second state of the electronic device 200 may be referred to as a "second shape". For example, the first shape may include a normal state, a reduced state, or a closed state, and the second shape may include an open state. According to an embodiment, the electronic device 200 may form a third state (e.g., an intermediate state) located between the first state and the second state. For example, the third state may be referred to as a "third shape", and the third shape may include a free stop state.

According to an embodiment, the display 230 may be visible or viewable from the outside in a front direction (e.g., −z direction) of the electronic device 200 so as to display visual information to the user. For example, the display 230 may include a flexible display. According to an embodiment, the display 230 may be disposed in the second housing 220 and be pulled-out from the internal space of the electronic device 200 according to the movement of the second housing 220 or may be pulled-in into the internal space of 200 of the electronic device. The internal space of the electronic device 200 may refer to an internal space defined by the first housing 210 and the second housing 220 formed by coupling of the first housing 210 and the second housing 220. For example, in the first state of the electronic device 200, at least a portion of the display 230 may be rolled up to be slid into the internal space of the electronic device 200. When the second housing 220 moves in the first direction while at least a portion of the display 230 is slidingly inserted into the internal space of the electronic device 200, at least a portion of the display 230 may be drawn out from the internal space of the electronic device 200. For another example, when the second housing 220 moves in the second direction, at least a portion of the display 230 may be rolled up into the inside of the electronic device 200 to be inserted into the internal space of the electronic device 200. As at least the portion of the display 230 is slid out from the internal space of the electronic device 200 or slid into the internal space of the electronic device 200, the display area of the display 230 visible from the outside of the electronic device 200 may be expanded or reduced. According to an embodiment, the display 230 may include a first region 230a and a second region 230b.

According to an embodiment, the first region 230a of the display 230 may fixedly refer to an area of the display 230 that is visible from the outside of the electronic device 200 regardless of whether the electronic device 200 is in the second state or the first state. For example, the first region 230a may indicate a partial area of the display 230 that is not rolled up into the internal space of the electronic device 200. According to an embodiment, as the second housing 220 moves, the first region 230a may move together with the second housing 220. For example, when the second housing 220 moves in the first direction or in the second direction, the first region 230a may be moved along with the second housing 220 on a front surface of the electronic device 200 either in the first direction or in the second direction.

According to an embodiment, the second region 230b of the display 230 may be connected to the first region 230a, and may be slid into the internal space or slid out from the internal space of the electronic device 200 as the second housing 220 moves. For example, the second region 230b of the display 230 may be in a rolled-up state, being retracted into the internal space of the electronic device 200, in the first state of the electronic device 200. The second region 230*b* of the display 230 may not be visible from the outside as it is fully slid into the internal space of the electronic device 200 in the first state of the electronic device 200. As another example, the second region 230*b* of the display 230 may be in a state drawn out from the internal space of the electronic device 200 in the second state of the electronic device 200. In the second state, the second region 230*b* of the display 230 may be visible from the outside of the electronic device 200.

According to an embodiment, in the first state of the electronic device 200, the area of the display 230 that is visible from the outside of the electronic device 200 may include only the first region 230*a* of the display 230. In the second state of the electronic device 200, the area of the display 230 that is visible from the outside of the electronic device 200 may include the first region 230*a* and at least a portion of the second region 230*b* of the display 230.

According to an embodiment, the first housing 210 of the electronic device 200 may include a book cover 211 surrounding the internal space of the first housing 210 and a rear plate 212 surrounding a back surface of the book cover 211. The second housing 220 of the electronic device 200 may include a front cover 221 surrounding the internal space of the electronic device 200.

According to an embodiment, the front cover 221 may include a first cover area 221*a* of the front cover 221 that is not pulled-in into the interior of the first housing 210, and a second cover area 221*b* that is pulled-in or pulled-out into/from the interior of the first housing 210. The first cover area 221*a* of the front cover 221 may be always visible regardless of whether the electronic device 200 is either in the second state or in the first state. According to an embodiment, at least a portion of the first cover area 221*a* of the front cover 221 may form a side surface 220*a* of the second housing 220. According to an embodiment, the second cover area 221*b* of the second housing 220 may not be visible in the first state, while it may be visible in the second state.

The camera 240 may acquire an image of a subject based on receiving light from the outside of the electronic device 200. According to an embodiment, the camera 240 may include one or more lenses, an image sensor, and/or an image signal processor. According to an embodiment, the camera 240 may be disposed on the second housing 220 so that it faces the rear surface of the electronic device 200 opposite to the front surface of the electronic device 200 on which the first region 230*a* of the display 230 is disposed. For example, the camera 240 may be disposed on the front cover 221 of the second housing 220 and may be visible from the outside of the electronic device 200 through an opening 211*a* formed in the book cover 211, when the electronic device 200 is in the first state. As another example, the camera 240 may be disposed on the front cover 221 of the second housing 220, and when the electronic device 200 is in the first state, it may be obscured by the book cover 211 and/or the rear plate 212, so that it may not be visible from the outside of the electronic device 200.

According to an embodiment, the camera 240 may include a plurality of cameras. For example, the camera 240 may include a wide-angle camera, an ultra-wide-angle camera, a telephoto camera, a close-up camera, and/or a depth camera. However, the camera 240 is not necessarily limited to including a plurality of cameras, and may include a single camera.

According to an embodiment, the camera 240 may further include a camera facing the front surface of the electronic device 200 on which the first region 230*a* of the display 230 is disposed. When the camera 240 faces the front surface of the electronic device 200, the camera 240 may be an under-display camera (UDC) disposed below the display 230 (e.g., in +z direction from the display 230), but the disclosure is not limited thereto.

According to an embodiment, the electronic device 200 may include a sensor module and/or a camera module disposed underneath the display 230. The sensor module may detect an external environment based on information (e.g., light) received through the display 230. According to an embodiment, the sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an IR (infrared) sensor, a biometric sensor, a temperature sensor, a humidity sensor, a motor encoder or an indicator. According to an embodiment, at least some sensor modules of the electronic device 200 may be visually exposed to the outside through a partial area of the display 230. According to an embodiment, the electronic device 200 may detect a pull-out length using a sensor module. According to an embodiment, the electronic device 200 may generate information on the pull-out length detected by the sensor. For example, the electronic device 200 may detect and/or identify a degree of pull-out of the second housing 220 using the pull-out information. According to an embodiment, the pull-out information may include information on the pull-out length of the second housing 220.

According to an embodiment, such a shape of coupling of the first housing 210 and the second housing 220 is not limited to the shape of coupling illustrated in FIGS. 2A, 2B, 2C and 2D, and it may be implemented by a combination and/or coupling of other shapes or parts.

Figure 3A:
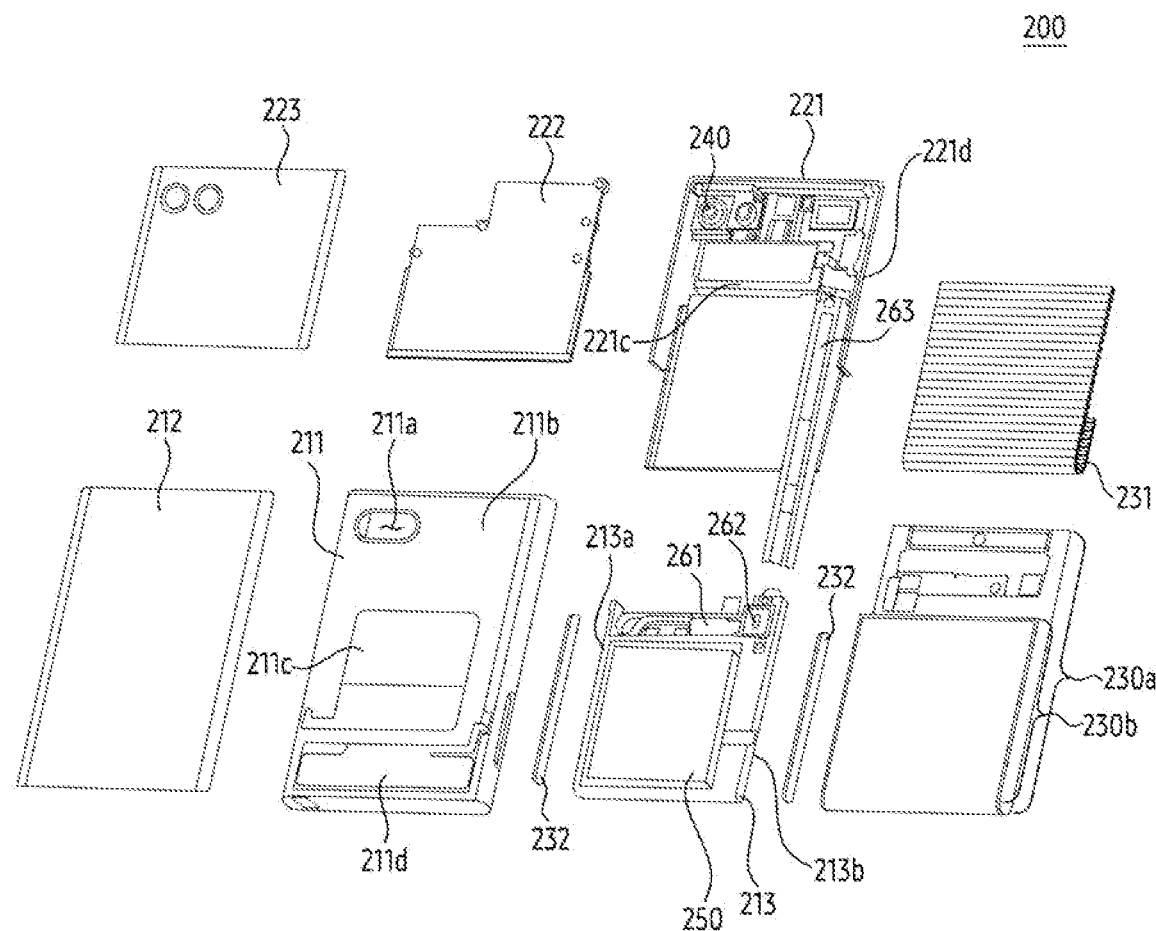
FIG. 3A is an exploded perspective view of an electronic device according to an embodiment.
Figure 3B:
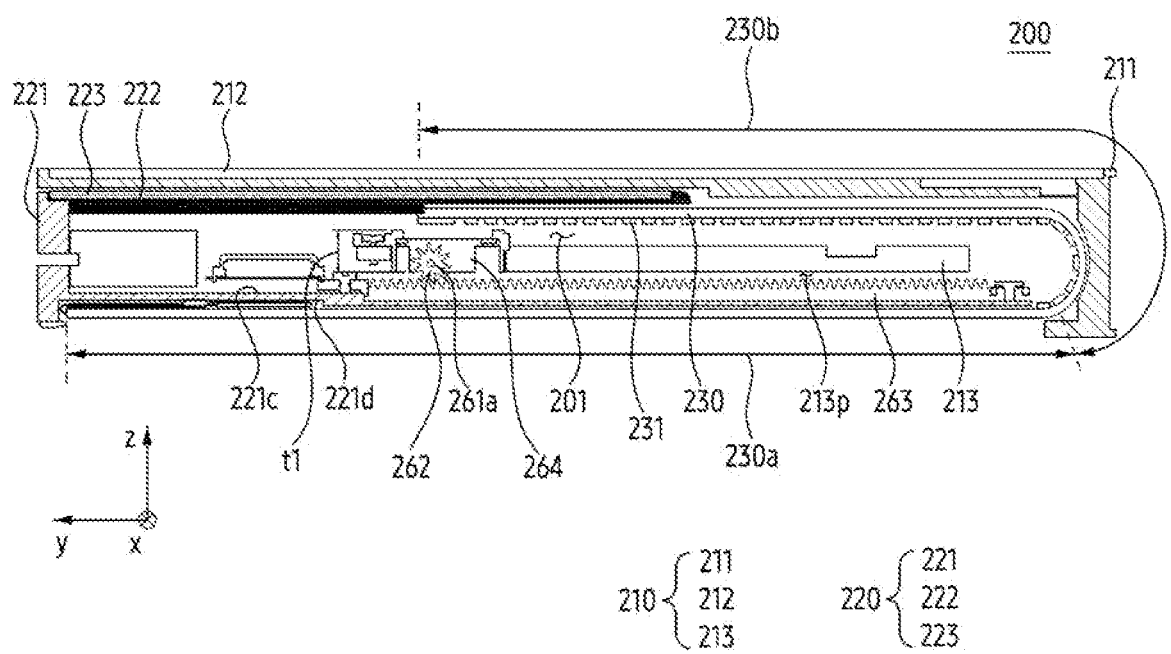
FIG. 3B is a cross-sectional view illustrating an example of an electronic device according to an embodiment taken along a line A-A' of FIG. 2A.

FIG. 3A is an exploded perspective view of an electronic device according to an embodiment, and FIG. 3B is a cross-sectional view of an electronic device according to an embodiment, taken along a line A-A' of FIG. 2A.

Referring to FIGS. 3A and 3B, according to an embodiment, the electronic device 200 may include a first housing 210, a second housing 220, a display 230, a camera 240, a battery 250 (e.g., the battery 189 of FIG. 1) and a driving module 260. According to an embodiment, the first housing 210 and the second housing 220 may be coupled to each other to form an internal space 201 of the electronic device 200. For example, in the first state of the electronic device 200, the second region 230*b* of the display 230 may be accommodated in the internal space 201.

According to an embodiment, the first housing 210 may include a book cover 211, a rear plate 212, and a frame cover 213. According to an embodiment, the book cover 211, the rear plate 212 and the frame cover 213 arranged in the first housing 210 may be coupled to each other, so that they may not move together with the second housing 220 when the second housing 220 moves with respect to the first housing 210.

According to an embodiment, the book cover 211 may form at least a portion of an outer surface of the electronic device 200. For example, the book cover 211 may form at least a part of the side surface of the electronic device 200 and at least a part of the rear surface of the electronic device 200. According to an embodiment, the book cover 211 may provide a surface on which the rear plate 212 is seated. The rear plate 212 may be seated on one surface 211*b* of the book cover 211.

According to an embodiment, the frame cover 213 may be configured to support various components within the electronic device 200. For example, the frame cover 213 may be configured to accommodate at least a portion of the battery 250 and the driving module 260. The battery 250 and the driving module 260 may be accommodated in at least one of a recess or a hole provided in the frame cover 213. According to an embodiment, the frame cover 213 may be surrounded by the book cover 211. For example, in the first state of the electronic device 200, one surface 213a of the frame cover 213 on which the battery 250 is disposed may be arranged to face the book cover 211 and/or the second region 230b of the display 230. As another example, in the first state of the electronic device 200, the other surface 213b of the frame cover 213 facing the one surface 213a of the frame cover 213 may be arranged to face the first region 230a of the display 230 or the front cover 221. For example, the frame cover 213 may include an aluminum material, but is not limited thereto.

According to an embodiment, the second housing 220 may include a front cover 221, a rear cover 222 and a slide cover 223. According to an embodiment, the front cover 221, the rear cover 222 and the slide cover 223 may be coupled to each other, and when the second housing 220 moves relative to the first housing 210, it may also move together with the second housing 220. The front cover 221 may be configured to support various components within the electronic device 200. For example, the camera 240 may be disposed on one surface 221c of the front cover 221 facing the internal space 201. The other surface 221d of the front cover 221 facing the one surface 221c of the front cover 221 may be arranged to face the first region 230a of the display 230, when the electronic device 200 is in the first state. According to an embodiment, the rear cover 222 may be coupled to the front cover 221 to protect various components in the electronic device 200 disposed on the front cover 221. For example, the rear cover 222 may cover a portion of one surface 221c of the front cover 221. According to an embodiment, the slide cover 223 may be disposed on the rear cover 222 to form an outer surface of the electronic device 200 together with the rear plate 212 and the book cover 211. The slide cover 223 may be coupled to one surface of the rear cover 222 to protect the rear cover 222 and/or the front cover 221.

According to an embodiment, when the electronic device 200 is in the first state, at least a part of the display 230 may be rolled up into the internal space 201, thereby causing it to be bent. According to an embodiment, the display 230 may cover at least a portion of the frame cover 213 and at least a portion of the front cover 221. For example, when the electronic device 200 is in the first state, the display 230 may be configured to cover the other surface 221d of the front cover 221 and pass between the front cover 221 and the book cover 211 to be extended toward the internal space 201. When the electronic device 200 is in the first state, the display 230 may pass between the front cover 221 and the book cover 211 and surround the frame cover 213 disposed in the internal space 201. The display 230 may cover one surface 213a of the frame cover 213 in the internal space 201. According to an embodiment, when the second housing 220 moves in the first direction, the second region 230b of the display 230 may be pulled-out from the internal space 201. For example, as the second housing 220 moves in the first direction, the display 230 may pass between the front cover 221 and the book cover 211 and may be pulled-out from the internal space 201.

According to an embodiment, the first region 230a of the display 230 may be in contact with the other surface 221d of the front cover 221. For example, the first region 230a may extend parallel to the other surface 221d of the front cover 221 while coming into contact with the other surface 221d of the front cover 221. Due to extending parallel to the other surface 221d of the front cover 221, the first region 230a may have a substantially planar shape. According to an embodiment, the first region 230a of the display 230 may not be deformed according to movement of the second housing 220. For example, the first region 230a may move along the movement of the second housing 220 while keeping such a planar shape.

According to an embodiment, the second region 230b of the display 230 may be deformable according to the movement of the second housing 220. For example, when the electronic device 200 is in the first state, the second region 230b may be bent with a certain curvature in the internal space 201 of the electronic device 200. When the second housing 220 moves in the first direction (e.g., +y direction), at least a portion of the second region 230b may be pulled out from the internal space 201 of the electronic device 200 to be parallel to the other surface 221d of the front cover 221. When at least a portion of the second region 230b is parallel to the other surface 221d of the front cover 221, at least a portion of the second region 230b may have no curvature and have a planar shape. As another example, when the second housing 220 moves in the second direction (e.g., −y direction), the at least a portion of the second region 230b may be slid into the internal space 201 of the electronic device 200. The at least a portion of the second region 230b may be rolled up to be bent with a certain curvature while being pulled-in into the internal space 201 of the electronic device 200.

According to an embodiment, the electronic device 200 may include a support member 231 supporting the display 230 and a guide rail 232. The support member 231 may include a plurality of bars coupled to each other, and may be manufactured in a shape corresponding to the shape of the second region 230b of the display 230. For example, the support member 231 may include a plurality of bars extending in a third direction (e.g., +x direction) perpendicular to a first direction (e.g., a +y direction). The support member 231 may be disposed on the second region 230b of the display 230. According to an embodiment, the support member 231 may move along with the display 230 as the display 230 moves. According to an embodiment, in the first state that the second region 230b of the display 230 is rolled up within the internal space 201, the support member 231 may be rolled up inside the internal space 201 together with the second region 230b of the display 230.

According to an embodiment, the guide rail 232 may be configured to guide the movement of the support member 231. For example, as the display 230 moves, the support member 231 may move along the guide rail 232 coupled to the frame cover 213. According to an embodiment, the guide rail 232 may include a plurality of guide rails 232 that are arranged spaced apart from each other at both peripheries of the frame cover 213 being spaced apart from each other in the third direction (e.g., +x direction) perpendicular to the first direction.

According to an embodiment, the driving module 260 may provide a driving force to the second housing 220 so that the second housing 220 can move relative to the first housing 210. According to an embodiment, the driving module 260 may include a motor 261, a pinion gear 262, a rack gear 263 and a bracket 264. The motor 261 may receive power from the battery 250 to provide the driving force to the second housing 220. According to an embodiment, the motor 261 may be disposed in the first housing 210 and, when the second housing 220 moves with respect to the first housing 210, it may not move together with the second housing 220. For example, the motor 261 may be disposed in a recess formed in the frame cover 213. According to an embodiment, the pinion gear 262 may be coupled to the motor 261 and rotate by a driving force provided from the motor 261. For example, the pinion gear 262 may be rotatably coupled to a shaft 261a that is a drive shaft of the motor 261, and may be rotatable with respect to the motor 261. According to an embodiment, the rack gear 263 may be meshed with the pinion gear 262 and move according to the rotation of the pinion gear 262. For example, the rack gear 263 may linearly reciprocate in either the first direction or the second direction according to the rotation of the pinion gear 262. According to an embodiment, the rack gear 263 may be disposed in the second housing 220. For example, the rack gear 263 may be coupled to the front cover 221 included in the second housing 220. According to an embodiment, the rack gear 263 may be movable within an operating space 213p formed in the frame cover 213. According to an embodiment, the bracket 264 may maintain a position of the pinion gear 262 so that the driving force of the motor 261 can be seamlessly transmitted to the rack gear 263.

According to an embodiment, when the pinion gear 262 rotates along the first rotational direction (e.g., clockwise in FIG. 4B), the rack gear 263 may move in the first direction (e.g., +y direction). When the rack gear 263 moves in the first direction, the second housing 220 coupled to the rack gear 263 may move in the first direction. As the second housing 220 moves in the first direction, the area of the display 230 that is visible from the outside of the electronic device 200 may be expanded. When the pinion gear 262 rotates in the second rotational direction (e.g., counterclockwise in FIG. 4B), the rack gear 263 may move in the second direction (e.g., −y direction). When the rack gear 263 moves in the second direction, the second housing 220 coupled to the rack gear 263 may also move in the second direction. As the second housing 220 moves in the second direction, the area of the display 230 that is visible from the outside of the electronic device 200 may be reduced.

In the above description, it has been described that the motor 261 and the pinion gear 262 are disposed in the first housing 210, and the rack gear 263 is disposed in the second housing 220, but the present disclosure is not limited thereto. According to other embodiments, the motor 261 and the pinion gear 262 may be disposed in the second housing 220, and the rack gear 263 may be disposed in the first housing 210.

Figure 4A:
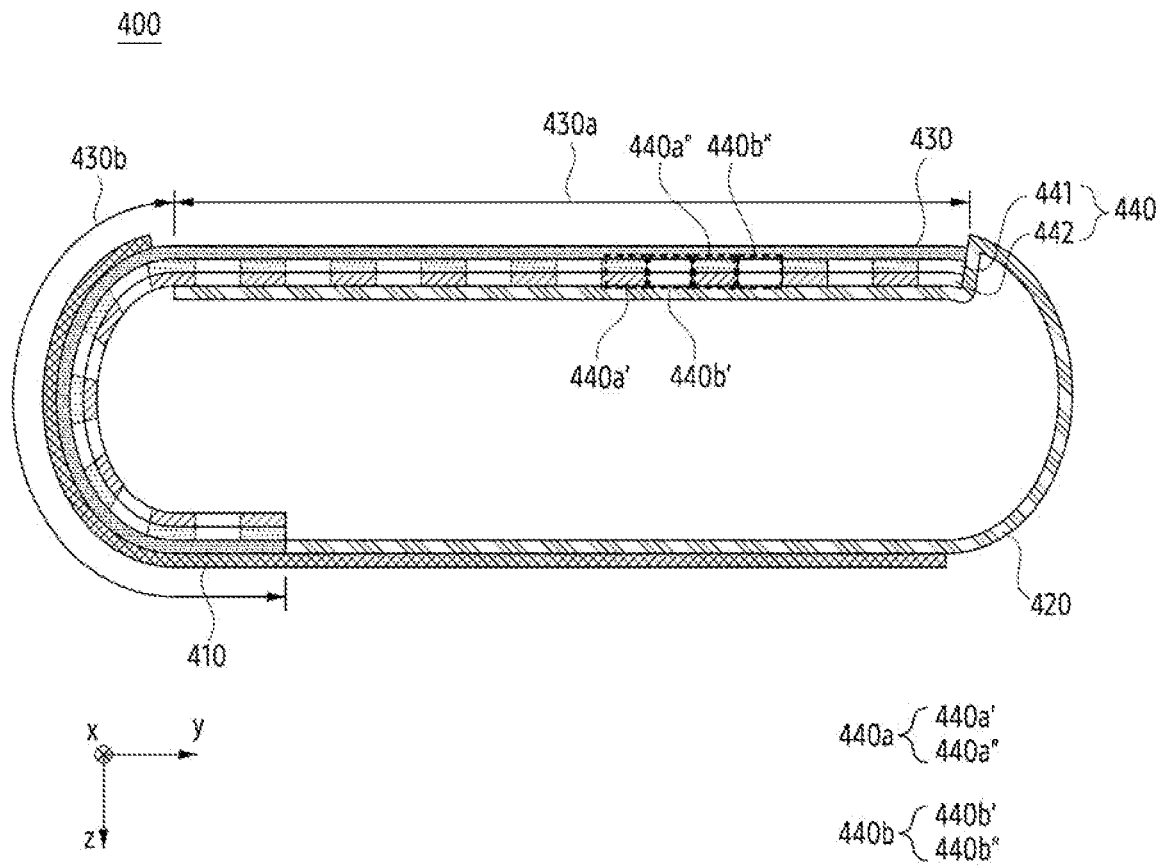
FIG. 4A is a cross-sectional view of an electronic device in a first state of according to an embodiment.
Figure 4B:
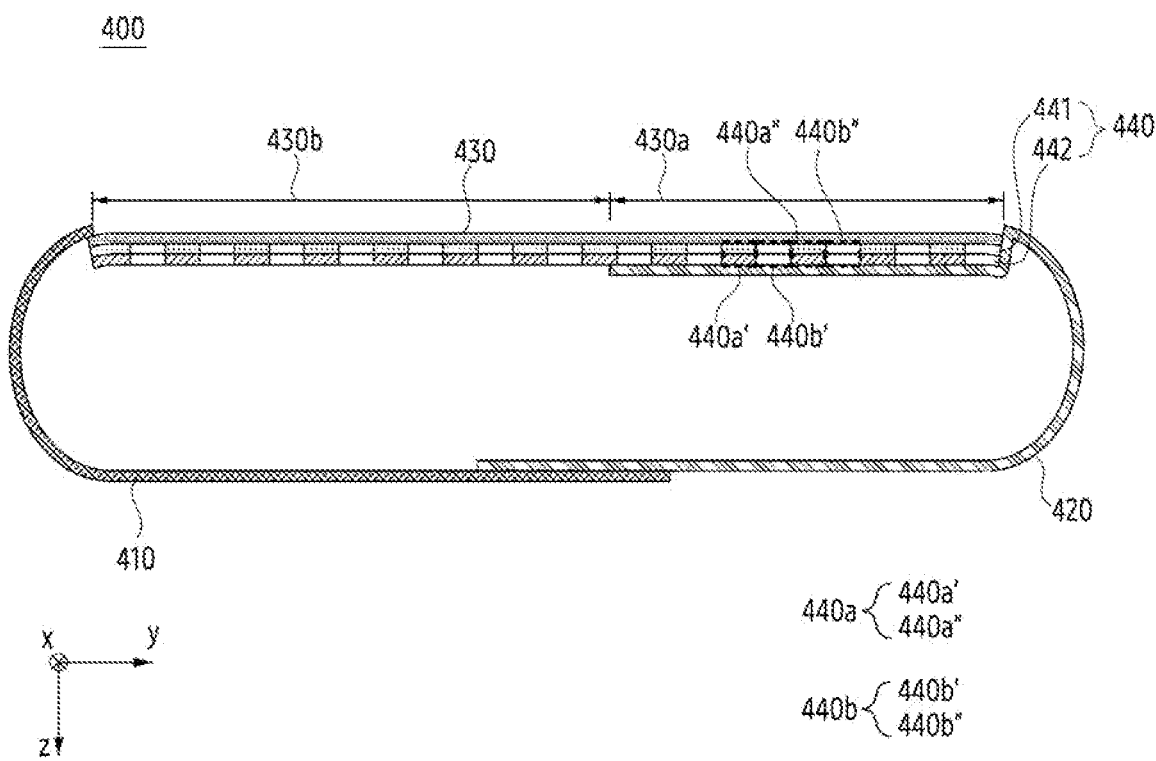
FIG. 4B is a cross-sectional view of an electronic device in a second state according to an embodiment.

FIG. 4A is a cross-sectional view of an electronic device in a first state according to an embodiment, and FIG. 4B is a cross-sectional view of an electronic device in a second state according to an embodiment.

Referring to FIGS. 4A and 4B, the electronic device 400 (e.g., the electronic device 101 of FIG. 1 or the electronic device 200 of FIG. 2A) may include a first housing 410 (e.g., the first housing 210 of FIG. 2A), a second housing 420 (e.g., the second housing 220 of FIG. 2A), a display 430 (e.g., the display module 160 of FIG. 1 or the display 230 of FIG. 2A), and a support plate 440.

According to an embodiment, the first housing 410 may constitute at least part of an exterior of the electronic device 400. The first housing 410 may include components constituting at least part of the exterior of the electronic device 400 (e.g., the book cover 211, the rear plate 212, and the frame cover 213 of FIG. 3B).

According to an embodiment, the second housing 420 may make up the remaining part of the exterior of the electronic device 400 in combination with the first housing 410. The second housing 420 may include components constituting at least part of the exterior of the electronic device 400 (e.g., the front cover 221, the rear cover 222, and the slide cover 223 of FIG. 3B).

According to an embodiment, the second housing 420 may be coupled to the first housing 410 so as to be slidable with respect to the first housing 410 along a first direction (e.g., +y direction) or along a second direction (e.g., −y direction) opposite to the first direction. For example, the second housing 420 may be coupled to at least a portion of the display 430. The second housing 420 may expand the display 430, moving along the first direction (+y direction). The second housing 420 may move along the second direction opposite to the first direction, thereby reducing the display 430.

According to an embodiment, the display 430 may make up at least part of the exterior of the electronic device 400. At least a portion of the display 430 may be exposed to the outside of the electronic device 400. For example, the display 430 may be supported by at least a portion of the first housing 410 and/or at least a portion of the second housing 420. One surface of the display 430 may be exposed to the outside of the electronic device 400.

According to an embodiment, the display 430 may include a planar region 430a (e.g., the first area 230a of FIG. 3B) and a deformable region 430b (the second area 230b of FIG. 3B). The planar region 230a may be an area disposed on the second housing 420 and exposed to the outside of the electronic device 400. The deformable region 430b may be, in the first state, pulled-in to be accommodated inside the electronic device 400, and may be, in the second state, pulled-out to be exposed to the outside of the electronic device 400. For example, the planar region 430a may be an area that may be always exposed to the outside of the electronic device 400, and the deformable region 430b may be an area that can be either expanded or reduced according to the state of the electronic device 400.

According to an embodiment, the deformable region 430b may be in contact with the planar region 430a. The deformable region 430b may extend from the planar region 430a. The deformable region 430b may be exposed to the outside as the second housing 420 moves in the first direction (e.g., +y direction) or may be positioned within the first housing 410 as the second housing 420 moves in the second direction (e.g., −y direction). For example, in the first state, the planar region 430a may be exposed to the outside, being coupled with a part of the second housing 420. The deformable region 430b may be in the first state positioned in an internal space of the electronic device 400, being rolled into the electronic device 400. The driving module of the electronic device 400 (e.g., the driving module 260, the motor 261, the pinion gear 262, the rack gear 263, and/or the bracket 264 of FIG. 3A) may move the second housing 420 in the first direction (e.g., +y direction) with respect to the first housing 410. For example, the driving module may transmit power to the second housing 420. Using the transmitted power, the planar region 430a supported by the second housing 420 may move in the first direction. Since the deformable region 430b is in contact with the planar region 430a and extends from the planar region 430a, the deformable region 430b may be exposed to the outside in the second state.

According to an embodiment, the support plate 440 may support the display 430. The support plate 440 may be disposed on one surface of the display 430 facing the internal space of the first housing 410 and the second housing 420 (e.g., in +z direction). The support plate 440 may be supported by at least a portion of the second housing 420. At least a portion of the support plate 440 may be disposed between the second housing 420 and the display 430.

According to an embodiment, the shape of the support plate 440 may correspond to the shape of the display 430 in order to support the display 430. The support plate 440 may be configured to change in shape according to the deformation of the display 430. For example, at least a portion of the support plate 440 may be disposed on the planar region 430a of the display 430. At least a portion of the support plate 440 may have a planar shape corresponding to the shape of the planar region 430a. For example, at least a portion of the support plate 440 may be disposed on the deformable region 430b of the display 430. The deformable region 430b may be in the first state rolled up into the internal space of the electronic device 400 and be in the second state deformed into the planar shape to be exposed to the outside of the electronic device 400. A portion of the support plate 440 disposed on the deformable region 430b may be configured to correspond to the deformed shape. For example, the deformable region 430b may come into contact with the planar region 430a and extend from the planar region 430a. The support plate 440 may have a shape corresponding to the planar region 430a and the deformable region 430b, so as to be positioned on the planar region 430a and the deformable region 430b.

According to an embodiment, the support plate 440 may include at least one rigid region 440a and at least one flexible region 440b extending from the rigid region 440a. The rigid region 440a may support the display 430. The flexible region 440b may be supported by the rigid region 440a. The flexible region 440b may be configured to change the shape of the support plate 440 to a shape corresponding to the shape according to the deformation of the display 430. The support plate 440 may include the rigid region 440a and the flexible region 440b so that it may be configured to support the display 430 and be changed to a shape corresponding to the display 430.

According to an embodiment, the support plate 440 may include rigid regions 440a' and 440a" and flexible regions 440b' and 440b" disposed between the rigid regions 440a' and 440a". For example, the first rigid region 440a' may be connected to one end of the first flexible region 440b' in the first direction. The second rigid region 440a" may be connected to the other end of the first flexible region 440b' in the second direction (e.g., -y direction). For example, the first flexible region 440b' may be disposed between the first rigid region 440a' and the second rigid region 440a". The first rigid region 440a' and the second rigid region 440a" may be spaced apart from each other with the first flexible region 440b' being interposed therebetween. One side of the second flexible region 440b" may be in contact with the second rigid region 440a", and the other side of the second flexible region 440b" may be in contact with another rigid region distinct from the first rigid region 440a' and the second rigid region 440a". Each of the flexible regions 440b' and 440b" may be arranged in a space between the rigid regions 440a' and 440a".

Heretofore, the support plate 440 has been described as including the first rigid region 440a', the second rigid region 440a", and the first flexible region 440b', but the disclosure is not limited thereto. The support plate 440 may include a plurality of rigid regions and a plurality of soft regions arranged between the plurality of rigid regions. For example, the support plate 440 may include the rigid regions 440a' and 440a", and the flexible regions 440b' and 440b". The first flexible region 440b' may be disposed between the first rigid region 440a' and the second rigid region 440a". The second rigid region 440a" may be disposed between the first flexible region 440b' and the second flexible region 440b". The first rigid region 440a', the first flexible region 440b', the second rigid region 440a", and the second flexible region 440b" may be sequentially arranged along the first direction (e.g., +y direction).

According to an embodiment, the support plate 440 may include a first layer 441 and a second layer 442. The first layer 441 may be disposed on one surface facing the internal space of the electronic device 400 to support the display 430. The first layer 441 may be disposed between the display 430 and the second layer 442. A portion of the first layer 441 may overlap the planar region 430a of the display 430, when looking at the planar region 430a of the display 430. The remaining part of the first layer 441 may overlap the deformable region 430b of the display 430, when looking at the deformable region 430b of the display 430.

The second layer 442 may be disposed on the first layer 441. A portion of the second layer 442 may be disposed between the second housing 420 and the first layer 441. A portion of the second layer 442 may overlap the planar region 430a of the display 430 when looking at the planar region 430a of the display 430. The remaining part of the second layer 442 may overlap the deformable region 430b of the display 430, when looking at the deformable region 430b of the display 430.

According to an embodiment, the support plate 440 may include at least one of carbon fiber reinforced polymer (CFRP), glass fiber reinforced plastics (GFRP), or stainless used steel (SUS). For example, the first layer 441 and/or the second layer 442 included in the support plate 440 may include at least one of CFRP, GFRP, or SUS.

According to an embodiment, the first layer 441 and the second layer 442 may be configured to be deformed into a shape corresponding to a changed shape of the display 430. For example, each of the layers 441 and 442 may include a plurality of rigid regions and flexible regions disposed between the plurality of rigid regions. Each of the flexible regions included in the first layer 441 may be configured to overlap each of the flexible regions included in the second layer 442, when looking at the support plate 440. The flexible regions included in the first layer 441 and the second layer 442 may have at least one opening or groove. The openings or grooves included in the flexible regions may provide flexibility for deformation of the first layer 441 and the second layer 442. For example, one of the plurality of flexible regions included in the first layer 441 and one of the plurality of flexible regions included in the second layer 442 may overlap each other to form the first flexible region 440b' of the support plate 440. As the layers 441 and 442 include overlapped flexible regions, a portion of the layers 441 and 442 disposed on the deformable region 430b of the display 430 may be configured to cause the display 430 to be deformed to a shape corresponding to the shape of the deformable region 430b as it moves from the first state to the second state or from the second state to the first state.

According to an embodiment, each of the plurality of rigid regions included in the layers 441 and 442 may be configured to overlap each other. For example, one of the plurality of rigid regions included in the first layer 441 and one of the plurality of rigid regions included in the second layer 442 can be overlapped to make up the first rigid region 440a' of the support plate 440. The overlapped rigid regions included in the layers 441 and 442 may support the display 430.

According to the above-described embodiment, the electronic device 400 includes the first layer 441 and the second layer 442 in the support plate 440 supporting the display 430 to support the display 430. The first layer 441 and the second layer 442 includes a plurality of flexible regions so that it can be deformed to a shape corresponding to a shape according to the deformation of the display 430.

Figure 5A:
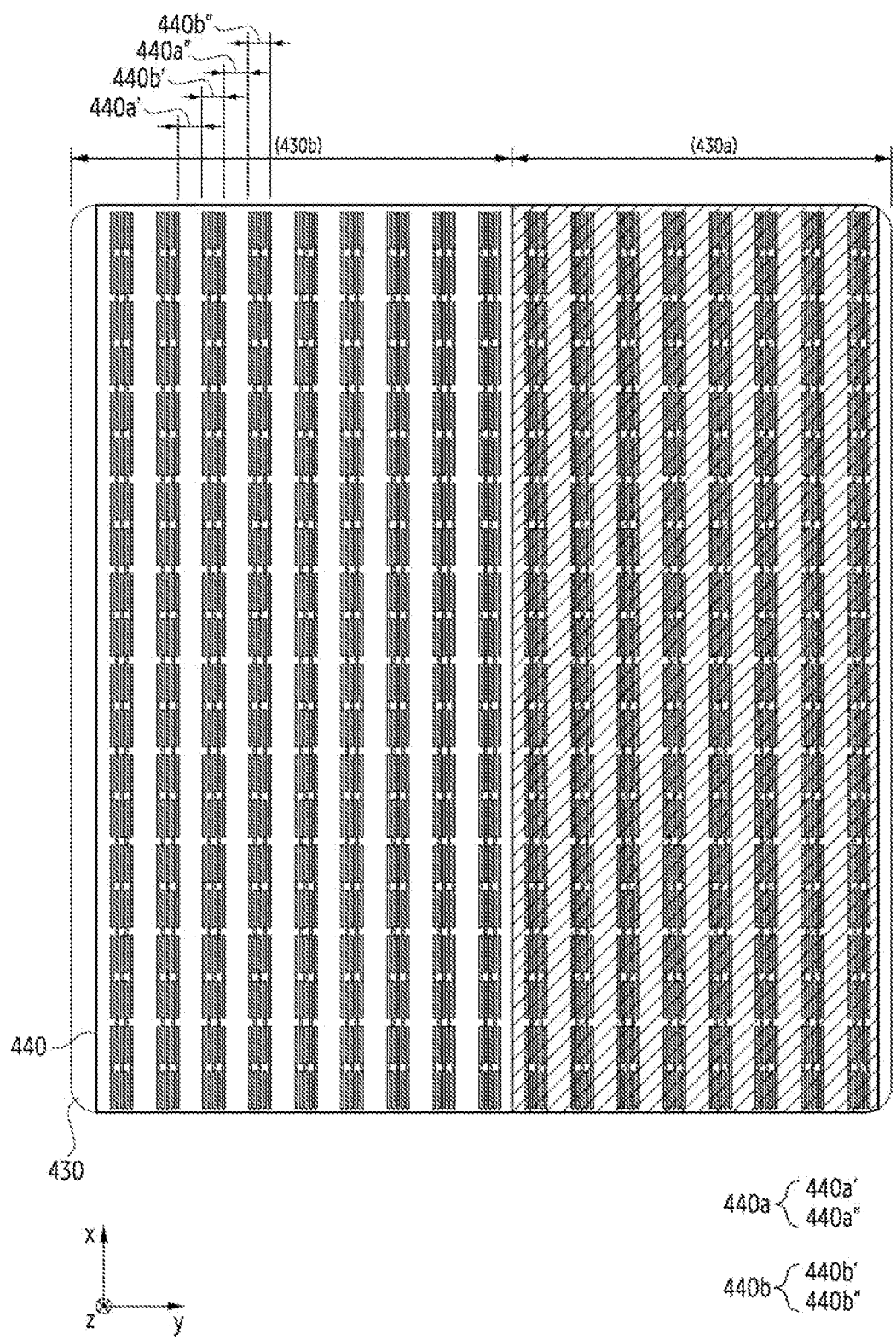
FIGS. 5A and 5B are front views of a display structure of an electronic device according to an embodiment.
Figure 5B:
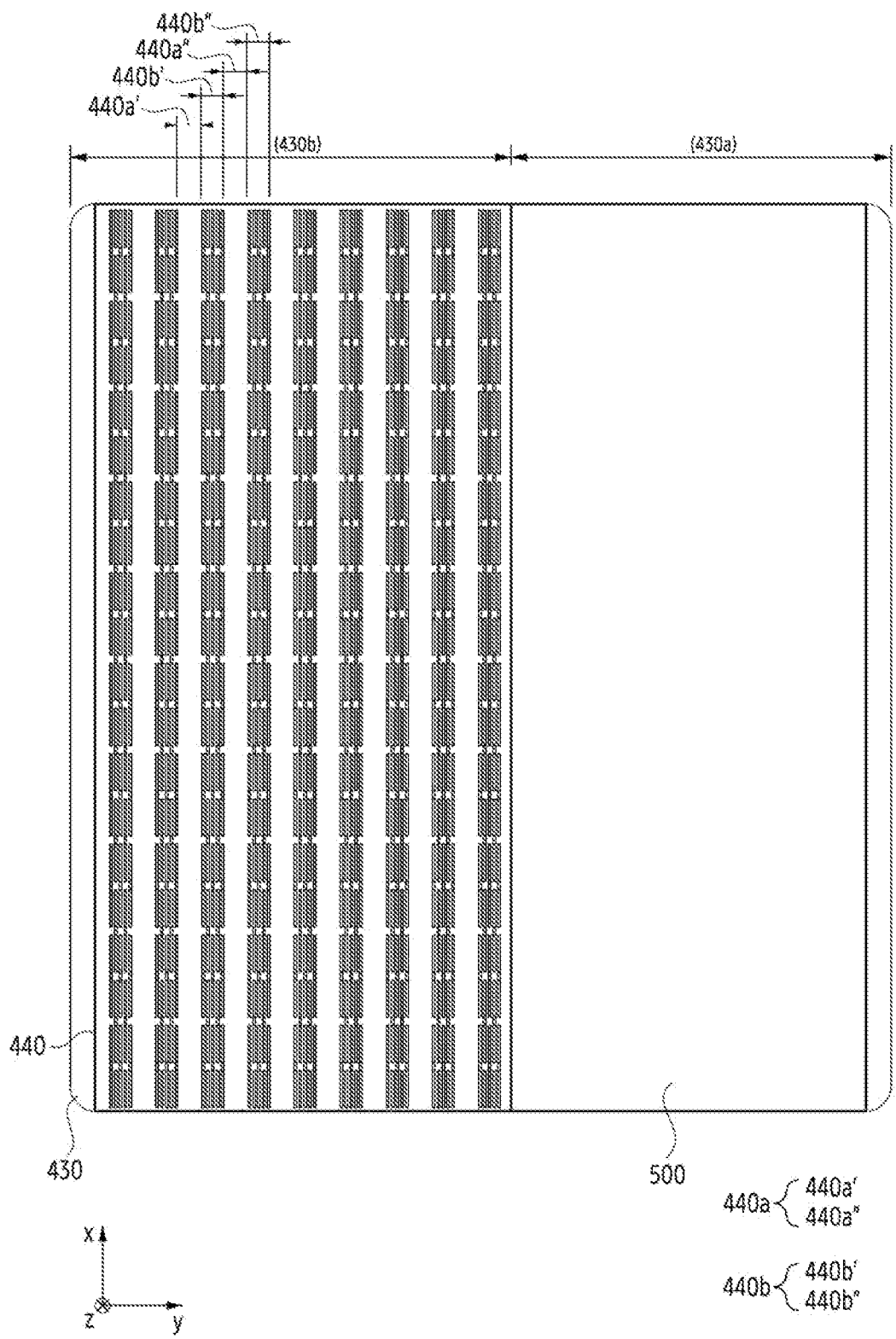

FIGS. 5A and 5B each show a front view of a display structure of an electronic device according to an embodiment.

Referring to FIG. 5A, an electronic device (e.g., the electronic device 101 of FIG. 1, the electronic device 200 of FIG. 2A, or the electronic device 400 of FIG. 4A) may include a display 430 and a support plate 440 disposed on one surface of the display 430 facing the inside of the electronic device 400 (e.g., in +z direction). The display 430 may include a planar region 430a and a deformable region 430b.

According to an embodiment, the support plate 440 disposed on the planar region 430a may be configured differently from the support plate 440 disposed on the deformable region 430b. The planar region 430a of the support plate 440 may extend from the deformable region 430b of the support plate 440 in the first direction (e.g., in +y direction). For example, the support plate 440 may include a plurality of rigid regions (e.g., a first rigid region 440a' and a second rigid region 440a") and a plurality of flexible regions (e.g., a first flexible region 440b' and a second flexible region 440b") disposed between the plurality of rigid regions. The material of the support plate 440 disposed on the planar region 430a may be different from that of the support plate 440 disposed on the deformable region 430b. Due the difference in the materials, the physical properties (e.g., rigidity) of the support plate 440 disposed on the planar region 430a and the support plate 440 disposed on the deformable region 430b may be different from each other. For example, the support plate 440 disposed on the planar region 430a may be formed of a material having higher rigidity than the support plate 440 disposed on the deformable region 430b. For example, the plurality of flexible regions disposed in the planar region 430a may have fewer openings than the plurality of flexible regions disposed in the deformable region 430b. For example, an area of the plurality of rigid regions disposed in the planar region 430a may be larger than an area of the plurality of rigid regions disposed in the deformable region 430b. For example, the area of the support plate 440 disposed on the planar region 430a and the support plate 440 disposed on the deformable region 430b may be the same. The support plate 440 disposed on the planar region 430a may further include at least one more rigid region than the support plate 440 disposed on the deformable region 430b.

Referring to FIG. 5B, unlike FIG. 5A, the support plate 440 may include a planar plate 500 including a continuous surface in a planar region 430a. The planar plate 500 including the continuous surface may have higher rigidity than the rigid regions. The support plate 440 may include a plurality of flexible regions (e.g., the first flexible region 440b' and the second flexible region 440b") disposed between a plurality of rigid regions (e.g., the first rigid region 440a' and the second rigid region 440a") and the plurality of rigid regions, in the deformable region 430b. For example, the support plate 440 may include, in the deformable region 430b, rigid regions 440a' and 440a" and a first flexible area 440b' disposed between the rigid regions 440a' and 440a".

Referring back to FIGS. 5A and 5B, the support plate 440 disposed in the planar region 430a may continuously extend from the support plate 440 disposed in the deformable region 430b. The support plate 440 disposed on the planar region 430a may be connected to the support plate 440 disposed on the deformable region 430b. For example, the support plate 440 disposed on the planar region 430a may be made of the same material as the support plate 440 disposed on the deformable region 430b. The support plate 440 disposed on the planar region 430a and the support plate 440 disposed on the deformable region 430b may be connected with the same material. The support plate 440 may be continuous at a boundary area in between the planar region 430a and the deformable region 430b. For example, the support plate 440 disposed on the planar region 430a and the support plate 440 disposed on the deformable region 430b may be welded with a different material from the support plate 440 and connected to each other. For example, the support plate 440 disposed in the planar region 430a and the support plate 440 disposed in the deformable region 430b may be coupled to each other using a fastening structure (e.g., a hook structure or a splice joint structure).

According to the above-described embodiment, the support plate 440 disposed on the display 430 of the electronic device 400 may be configured differently from the deformable region 430b in the planar region 430a, thereby reinforcing the planar region 430a exposed to the outside in the first state and providing flexibility to the deformed area 430b rolled up in the first state.

Figure 6A:
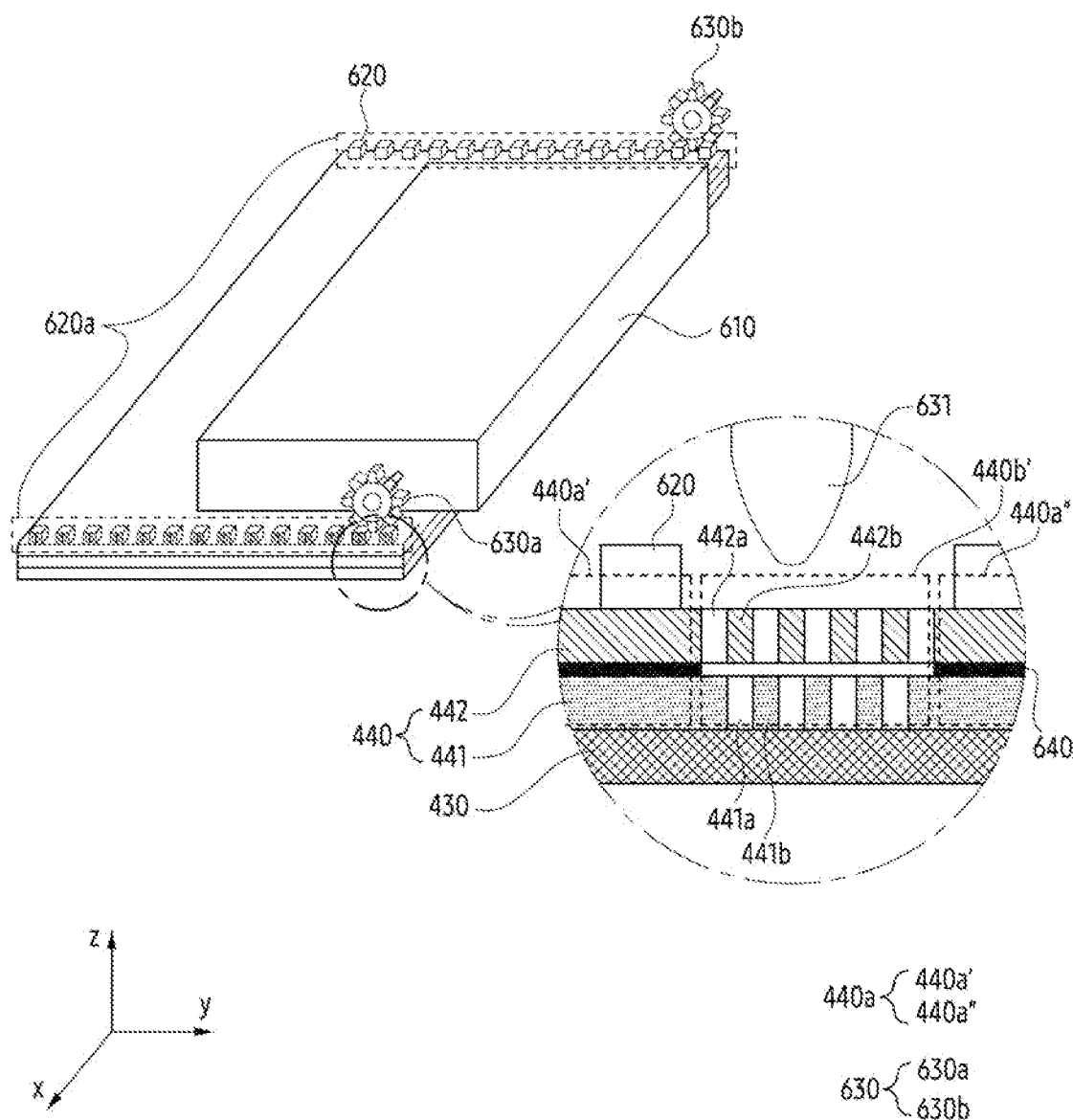
FIG. 6A illustrates part of an internal structure of an electronic device with a gear head being disposed according to an embodiment.

FIG. 6A illustrates a portion of an internal structure of an electronic device with a gear head being disposed, according to an embodiment.

Referring to FIG. 6A, an electronic device (e.g., the electronic device 101 of FIG. 1, the electronic device 200 of FIG. 2A, or the electronic device 400 of FIG. 4A) may include a display 430, a support plate 440, a battery 610, at least one gear head 620 and a guide gear 630. According to an embodiment, the support plate 440 may include rigid regions 440a' and 440a" and a first flexible region 440b' disposed between the rigid regions 440a' and 440a". According to an embodiment, the support plate 440 may include a first layer 441 and a second layer 442. However, the disclosure is not limited thereto. For example, the support plate 440 may further include a third layer disposed on the second layer 442.

According to an embodiment, the first flexible region 440b' may include a plurality of openings spaced apart at a certain length in a third direction (e.g., +x direction) perpendicular to the first direction (e.g., +y direction). For example, the first flexible region 440b' may include a plurality of first openings included in the first layer 441 and a plurality of second openings included in the second layer 442, having a certain length in the third direction. Each of the plurality of first openings may be spaced apart from each other in the first direction and/or the third direction. Each of the plurality of second openings may be spaced apart from each other in the first direction and/or the third direction. For example, one first opening 441a of the plurality of first openings may be spaced apart from one second opening 442a of the plurality of second openings in the first direction (e.g., +y direction). A portion of the first opening 441a may overlap the second opening 442a, when viewing the display 430 from above. Each of the plurality of first openings may partially overlap each of the plurality of second openings, when viewing the display 430 from above.

According to an embodiment, the first layer 441 may include a plurality of first openings extending in the third direction (e.g., +x direction) in the first flexible region 440b'. The second layer 442 may be disposed on the first layer 441 and may include a plurality of second openings in the first flexible region 440b'. For example, one surface of each of the plurality of first openings may be in contact with the display 430, and the other surface facing the one surface of each of the plurality of first openings may be in contact with the second layer 442. For example, one surface of each of the plurality of second openings may be in contact with the first layer 441, and the other surface facing one surface of each of the plurality of second openings may be directed to the inside of the electronic device 400 (e.g. in +z direction).

According to an embodiment, the first layer 441 may further include one first bridge 441b in contact with one end of one first opening 441a, among a plurality of first bridges. The second layer 442 may further include one second bridge 442b in contact with one end of one second opening 442a, among a plurality of second bridges. According to an embodiment, the first layer 441 may include a plurality of first openings and a plurality of first bridges causing the plurality of first openings to be spaced apart from each other. The second layer 442 may include a plurality of second openings and a plurality of second bridges causing the plurality of second openings to be spaced apart from each other. For example, each of the plurality of first bridges may be disposed between the plurality of first openings along the first direction (e.g., +y direction) and/or the third direction (e.g., +x direction) to space the plurality of first openings apart from each other. Each of the plurality of second bridges may be disposed between the plurality of second openings along the first direction and/or the third direction to space the plurality of second openings apart from each other.

According to an embodiment, the battery 610 may be disposed in an internal space of the electronic device 400. The battery 610 may be disposed on the support plate 440. The battery 610 may supply electric power to various electronic components within the electronic device 400. For example, the battery 610 may be configured to supply electric power to a driving module (e.g., the driving module 260 of FIG. 3A) and a motor (e.g., the motor 261 of FIG. 3A) in the electronic device 400, so that the driving module and the motor can transmit power to a pinion gear (e.g., the pinion gear 262 of FIG. 3A), a rack gear (e.g., the rack gear 263 of FIG. 3A), or a guide gear 630. The battery 610 may supply electric power to a processor (e.g., the processor 120 of FIG. 1) or the display 430 in the electronic device 400.

According to an embodiment, the at least one gear head 620 may transmit power transmitted from the motor 261 to the guide gear 630, to the display 430 and the support plate 440. For example, the at least one gear head 620 may engage with gear teeth 631 of the guide gear 630. The at least one gear head 620 may guide so that the display 430 move in the first direction (e.g., +y direction) or in the second direction (e.g., −y direction) opposite to the first direction. The at least one gear head 620 may be arranged in both peripheries of the support plate 440 extending in a direction parallel to the first direction (e.g., +y direction), within a plurality of rigid regions (e.g., the first rigid region 440a' and the second rigid region 440a") of the support plate 440. However, the disclosure is not limited thereto. For example, the support plate 440 may include a plurality of rigid regions (e.g., the first rigid regions 440a' and the second rigid region 440a") disposed on both peripheries of the support plate 440 extending in a direction parallel to the first direction. The support plate 440 may include a plurality of flexible regions disposed between the rigid regions to space each of the rigid regions apart from each other. Each of the plurality of flexible regions may have the same length in the first direction. Each of the gear heads included in a first set of gear heads 620a may be disposed on both peripheries of the support plate 440, corresponding to each of the plurality of rigid regions and extending in the direction parallel to the first direction at both peripheries of the support plate 440. Each of the gear heads included in the first set of gear heads 620a may be disposed to protrude toward the inside of the electronic device 400 (e.g., in +z direction). Since each of the plurality of rigid regions is spaced apart at the same interval by each of the plurality of flexible regions, each of the gear heads included in the first set of gear heads 620a may be correspondingly spaced at the same interval. The gear teeth 631 of the guide gear 630 may be inserted into a space formed between the gear heads included in the first set of gear heads 620a.

According to an embodiment, the electronic device 400 may further include a guide gear 630 engaged with at least one gear head 620 and guiding movement of the display 430. For example, the guide gear 630 may receive power from the motor 261 to guide the display 430 to move either in the first direction (e.g., +y direction) or in the second direction (e.g., −y direction) opposite to the direction, engaging with at least one gear head 620. The guide gear 630 may engage with the gear heads included in the first set of gear heads 620a arranged along both peripheries of the support plate 440. For example, the guide gear 630 may include a first guide gear 630a and a second guide gear 630b. Each of the guide gears 630a and 630b may be disposed on both peripheries of the support plate 440 extending in the direction parallel to the first direction (e.g., +y direction). The first guide gear 630a may engage with a plurality of gear heads arranged along one periphery of both peripheries of the support plate 440. The second guide gear 630b may engage with a plurality of gear heads arranged along the one periphery and the other periphery of both peripheries of the support plate 440.

According to an embodiment, the electronic device 400 may further include an adhesive member 640 disposed between the first layer 441 and the second layer 442 disposed on the first layer, in a region corresponding to a plurality of rigid regions (e.g., the first rigid region 440a' and the second rigid region 440a") of the support plate 440. However, the disclosure is not limited thereto. For example, the support plate 440 may include a plurality of rigid regions and a plurality of flexible regions disposed between the plurality of rigid regions. The adhesive member 640 may be disposed between the first layer 441 and the second layer 442, in the region corresponding to the plurality of rigid regions. The adhesive member 640 may be configured to maintain the shape of the support plate 440.

According to an embodiment, the support plate 440 may further include a third layer disposed on the second layer 442. The third layer may be configured to be substantially the same as or similar to the second layer 442. The adhesive member 640 may be disposed between the second layer 442 and the third layer in a region corresponding to the plurality of rigid regions. For example, the adhesive member 640 may include an adhesive tape. According to an embodiment, the adhesive member 640 may be omitted. In the regions corresponding to the plurality of rigid regions, the first layer 441 and the second layer 442 may be attached by means of a thermal compression process. The second layer 442 and the third layer may be attached by means of a thermal compression process in the regions corresponding to the plurality of rigid regions. The support plate 440 may have a designated thickness in order to secure the rigidity of the rigid region 440*a*. The support plate 440 may be arranged with various shapes of a plurality of openings and slits so as to secure the ductility in the flexible region including the first flexible region 440*b*'. The number of layers of the support plate 440 may be determined depending on the shape and arrangement of the openings and slits.

According to the above-described embodiment, the support plate 440 can increase the rigidity to support the display 430 by means of attachment of the first layer 441 and the second layer 442 in the regions corresponding to the plurality of rigid regions. The support plate 440 may include, in the regions corresponding to the plurality of flexible regions, a first layer 441 including a plurality of first openings and a plurality of first bridges to space each of the plurality of first openings apart from each other, and a second layer 442 disposed on the first layer 441 and including a plurality of second openings and a plurality of second bridges to space each of the plurality of second openings apart from each other, thereby increasing the rigidity to support the deformable area of the display 430 (e.g., the second area 230*b* of FIG. 3B and the deformable area 430*b* of FIG. 4A), so that the support plate 440 can be configured to be deformed into a shape corresponding to the shape of the deformable region 430*b*. The electronic device 400 may include at least one gear head disposed on each of the plurality of rigid regions, and a guide gear 630 engaged with the gear head, thereby guiding the display 430 in which the support plate 440 is disposed.

Figure 6B:
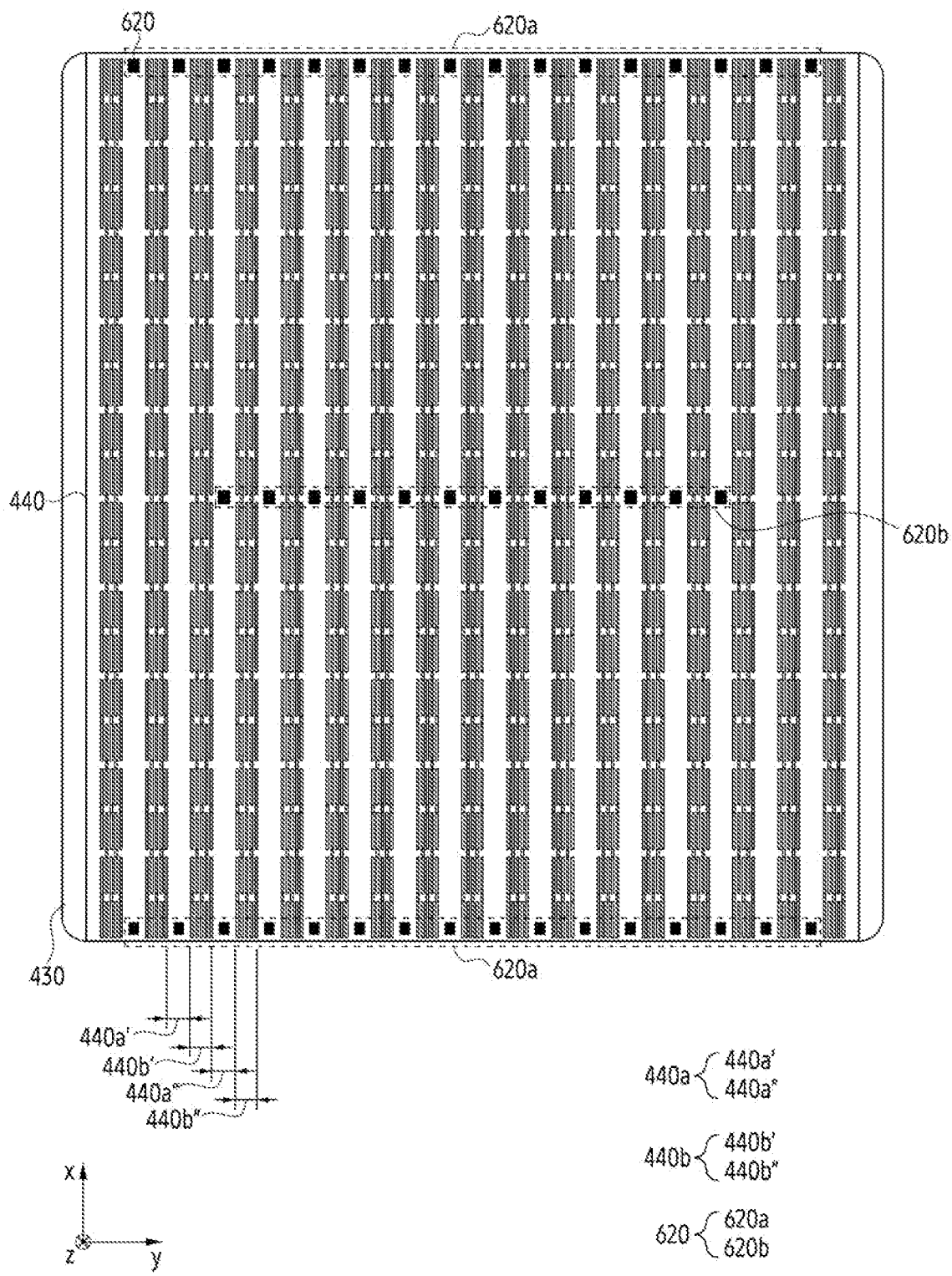
FIGS. 6B and 6C are front views of a display structure of an electronic device with a gear head being disposed according to an embodiment.
Figure 6C:
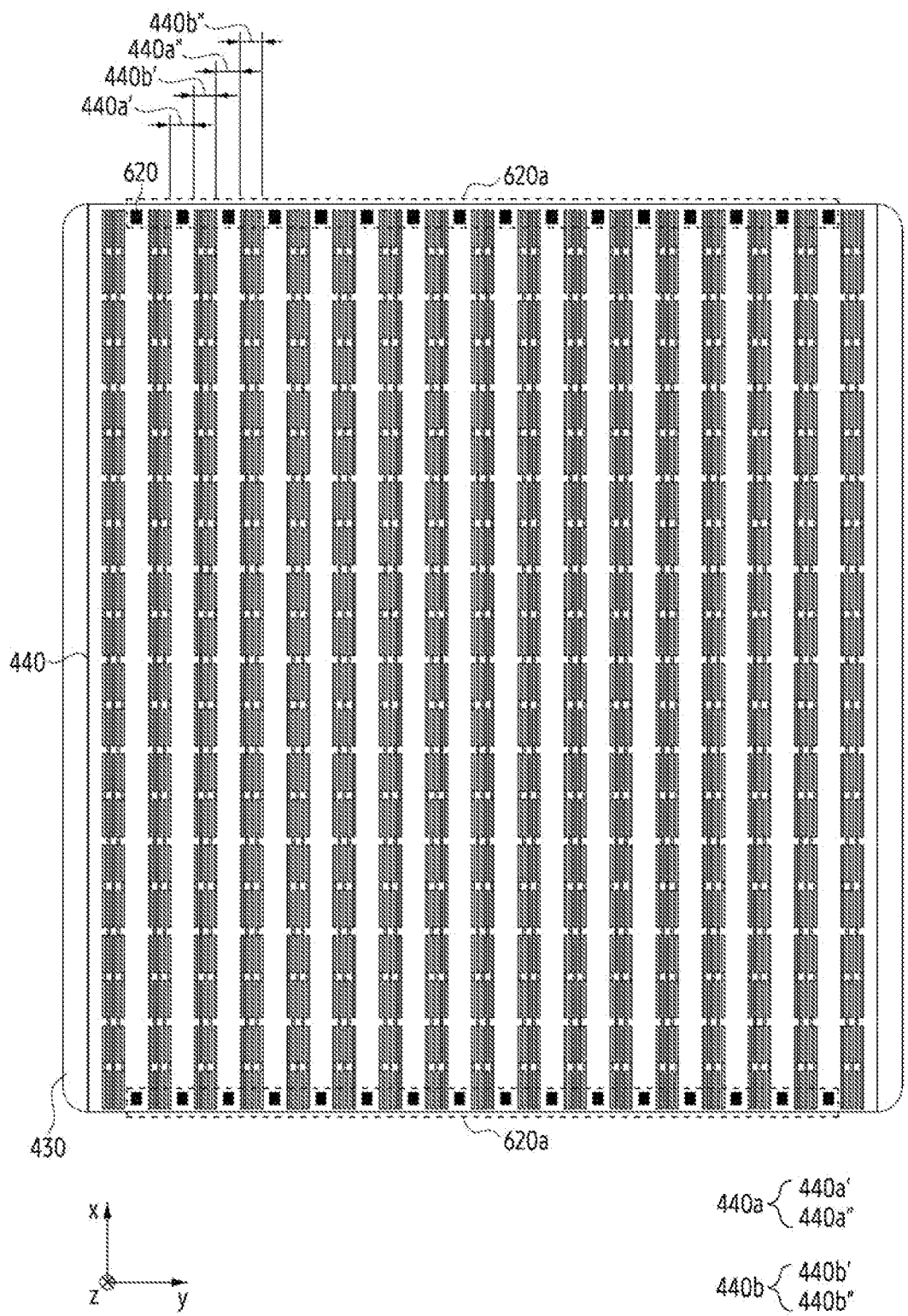

FIGS. 6B and 6C are front views of a display structure of an electronic device with a gear head being disposed therein according to an embodiment.

Referring to FIGS. 6B and 6C, an electronic device (e.g., the electronic device 101 of FIG. 1, the electronic device 200 of FIG. 2A, or the electronic device 400 of FIG. 4A) may include a display 430, a support plate 440 and at least one gear head 620. According to an embodiment, the support plate 440 may include a plurality of rigid regions (e.g., the first rigid region 440*a*' and a second rigid region 440*a*") and a plurality of flexible regions (e.g., a first flexible region 440*b*' and a second flexible region 440*b*") disposed between the plurality of rigid regions. According to an embodiment, the support plate 440 may include a first layer (e.g., the first layer 441 of FIG. 4A) and a second layer (e.g., the second layer 442 of FIG. 4A), but the disclosure is not limited thereto.

According to an embodiment, the at least one gear head 620 may be disposed in the plurality of rigid regions (e.g., the first rigid region 440*a*' and the second rigid region 440*a*") of the support plate 440. A first set of gear heads 620*a* may be disposed on both peripheries of the support plate 440 extending in the direction parallel to the first direction (e.g., the +y direction). A second set of gear heads 620*b* may be spaced apart by a designated distance from one of both the peripheries toward the other periphery. The gear heads included in the second set of gear heads 620*b* may be arranged in the direction parallel to the first direction. For example, the support plate 440 may include the rigid regions 440*a*' and 440*a*" disposed on both peripheries of the support plate 440 extending in the direction parallel to the first direction, and extending from one of both peripheries up to the other one of both peripheries. The second rigid region 440*a*" may include some of the first set of gear heads 620*a* disposed on both the peripheries. The second rigid region 440*a*" may include some of the second set of gear heads 620*b* spaced apart by a designated distance from one edge in the second rigid region 440*a*" toward the other periphery. Some of the second set of gear heads 620*b* may reduce deflection (or sagging) of the display 430. According to an embodiment, the second set of gear heads 620*b* may be disposed at the center of both the peripheries of the support plate 440 extending in the first direction. According to an embodiment, referring to FIG. 6C, the second set of gear heads 620*b* may be omitted.

According to the above-described embodiment, the support plate 440 may include a set of second gear heads 620*b* disposed in the center of both peripheries parallel to the first direction (e.g., +y direction), thereby reducing the deflection of the central portion of the display 430 toward the inside of the electronic device 400 (e.g., in +z direction). Since the support plate 440 includes a plurality of layers, the rigidity for supporting the display 430 can be reinforced, so that some or all of the second set of gear heads 620*b* disposed in the center portion may be omitted. Such omission of some or all of the second set of gear heads 620*b* makes it possible to provide for an additional space for the battery 610 inside the electronic device 400.

Figure 7A:
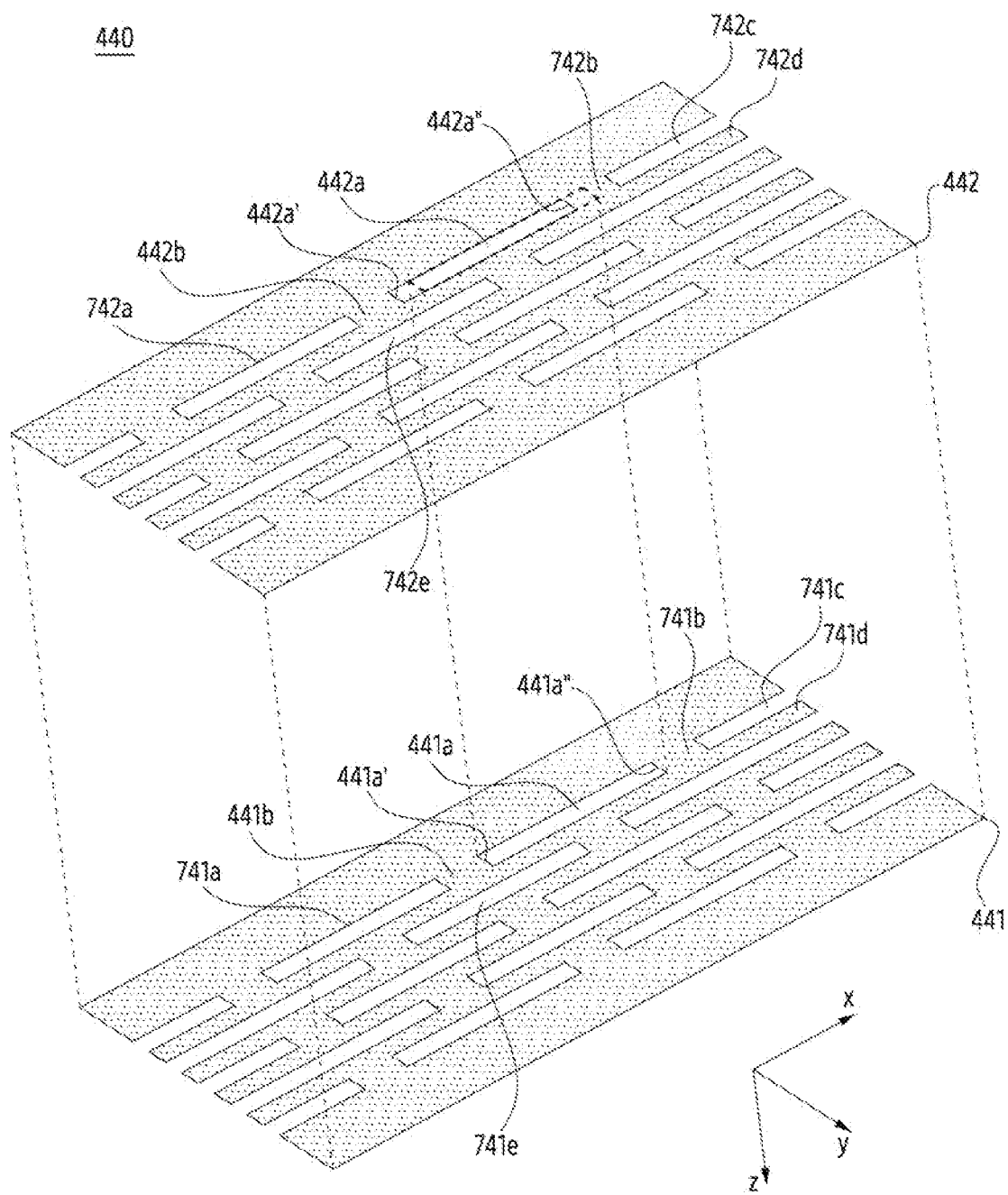
FIG. 7A is an exploded perspective view of a display support structure of an electronic device according to an embodiment.
Figure 7B:
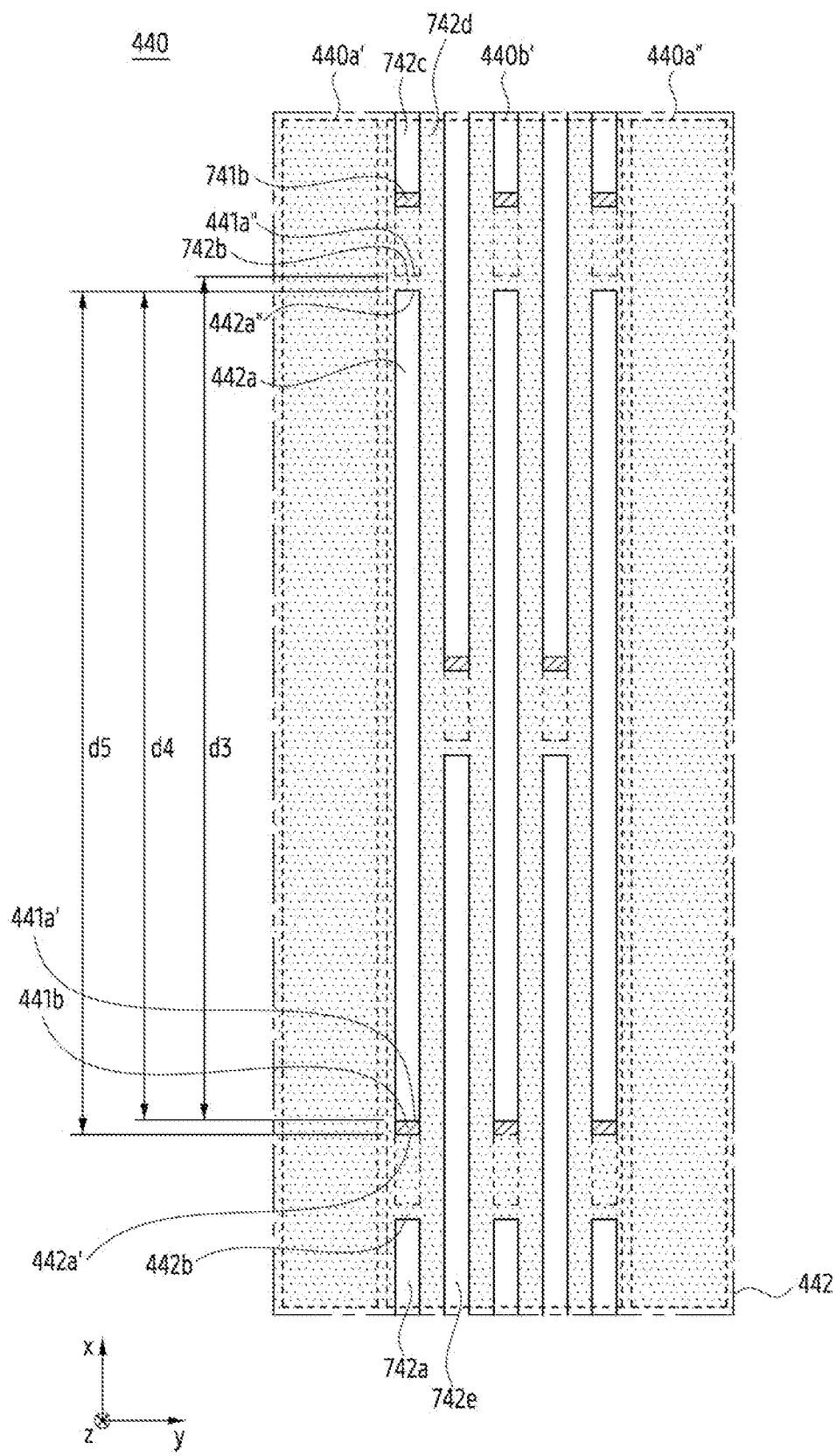
FIGS. 7B, 7C, 7D and 7E are front views of a display support structure of an electronic device according to an embodiment.
Figure 7C:
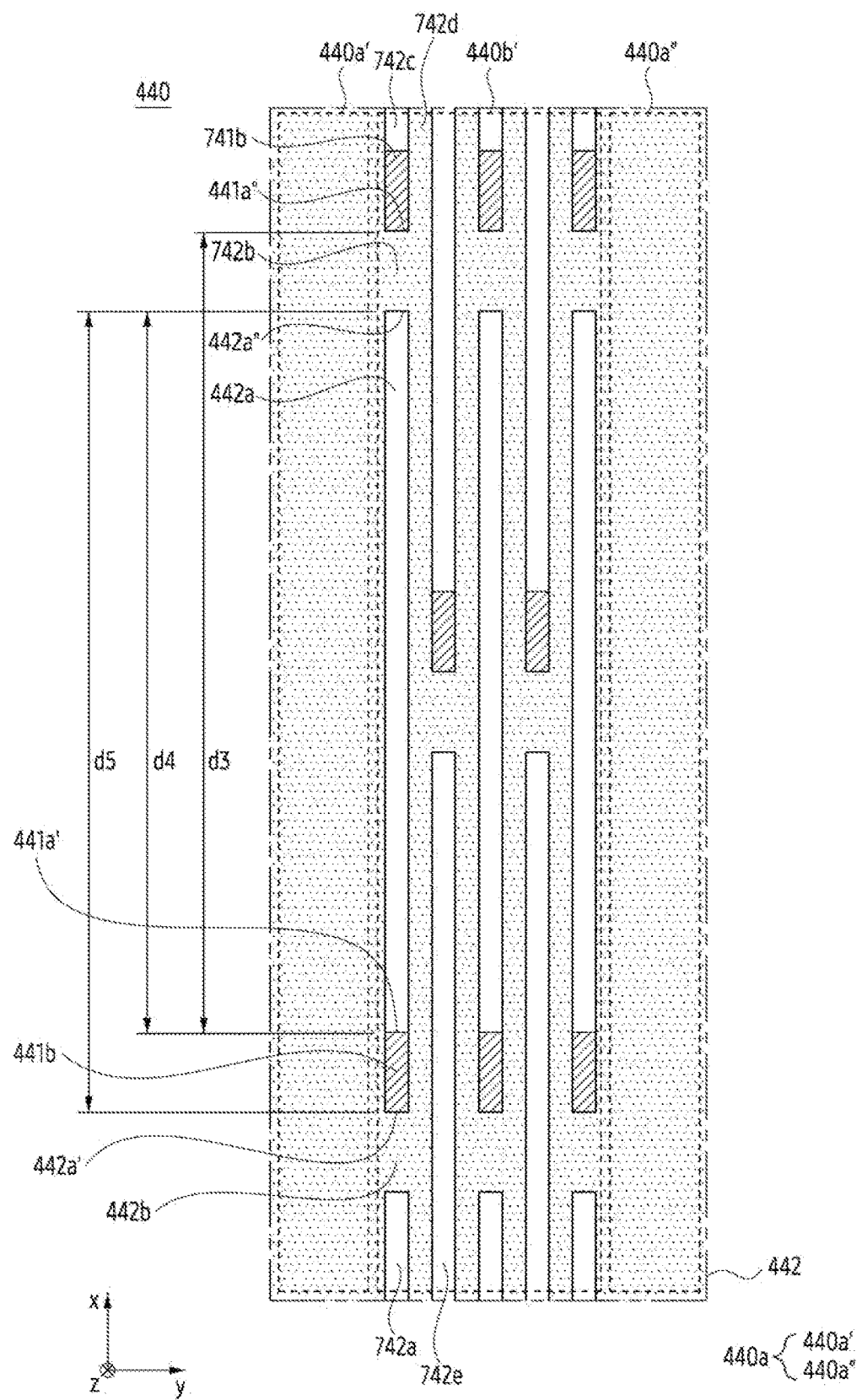

FIG. 7A is an exploded perspective view of a display support structure of an electronic device according to an embodiment. FIGS. 7B and 7C are front views of a display support structure according to an embodiment.

Referring to FIGS. 7A, 7B, and 7C, the support plate 440 may include rigid regions 440*a*' and 440*a*" (e.g., the first rigid region 440*a*' and the second rigid region 440*a*" of FIG. 6B) and flexible regions 440*b*' and 440*b*" (e.g., the first flexible region 440*b*' and the second flexible region 440*b*" of FIG. 6B) disposed between the rigid regions 440*a*' and 440*a*". The support plate 440 may include a first layer 441 and a second layer 442. The first layer 441 may include a plurality of first openings 441*a*, 741*a*, 741*c*, and 741*e* extending in a third direction (e.g., +x direction) in the first flexible region 440*b*'. The first layer 441 may include a plurality of first bridges 441*b*, 741*b*, and 741*d* to space apart the first openings 441*a*, 741*a*, 741*c*, and 741*e* from each other. The second layer 442 may be disposed on the first layer 441 and include a plurality of second openings 442*a*, 742*a*, 742*c*, and 742*e*. The second layer 442 may include a plurality of second bridges 442*b*, 742*b*, and 742*d* to space apart the second openings 442*a*, 742*a*, 742*c*, and 742*e*.

According to an embodiment, the first layer 441 may include one first opening 441*a* of a plurality of first openings 441*a*, 741*a*, 741*c* and 741*e* having a certain length in the third direction (e.g., +x direction) in the first flexible region 440*b*'. The first layer 441 may include one first bridge 441*b* in contact with one end 441*a*' of the first opening 441*a* and another first bridge 741*b* in contact with the other end 441*a*" of the first opening 441*a*. The first layer 441 may include a first opening 741*a* disposed in a fourth direction (e.g., −x direction) opposite to the third direction (e.g., +x direction) with respect to the first opening 441*a*, and another first opening 741*c* disposed in the third direction with respect to the first opening 441*a*. The first opening 441*a* and the first opening 741*a* disposed in the fourth direction with respect to the one first opening 441*a* may be spaced apart by the one first bridge 441*b*. The first opening 441*a* and the first opening 741*c* disposed in the third direction with respect to the first opening 441*a* may be spaced apart by the other first bridge 741*b*. According to an embodiment, the first layer 441 may include a plurality of first intermediate bridges extending in the direction parallel to the third direction. For example, the first layer 441 may include a first opening 741*e* disposed in the first direction (e.g., +y direction) with respect to the one first opening 441a. The one first opening 441a and the first opening 741e disposed in the first direction with respect to the first opening 441a may be spaced apart by one first intermediate bridge 741d of a plurality of first intermediate bridges. The first layer 441 may include a first openings 741e disposed in the first direction with respect to the first opening 441a and a plurality of first openings spaced apart in the third direction and/or the fourth direction. However, the disclosure is not limited thereto, and the first layer 441 may include a plurality of first openings having a certain length in the third direction and spaced apart from each other in the first direction or the third direction. The first layer 441 may include a plurality of first intermediate bridges to space each of the plurality of first openings apart from each other in the direction parallel to the first direction.

According to an embodiment, the second layer 442 may be disposed on the first layer 441 and include a plurality of second openings 442a, 742a, 742c, and 742e in the first flexible region 440b'. The second layer 442 may have a configuration that is substantially the same as or similar to that of the first layer 441. For example, the second layer 442 may include one second opening 442a among the second openings 442a, 742a, 742c, and 742e. The second layer 442 may include a second bridge 442b in contact with one end 442a' of the second opening 442a and a second bridge 742b in contact with the other end 442a" of the second opening 442a. The second layer 442 may include a second opening 742c disposed in the third direction (e.g., +x direction) with respect to the second opening 442a and a second opening 742a disposed in the fourth direction (e.g., -x direction) opposite to the third direction with respect to the second opening 442a. The second layer 442 may include a second opening 742e disposed in the first direction (e.g., +y direction) with respect to the one second opening 442a and a plurality of second intermediate bridges extending in the direction parallel to the third direction. One second bridge 742d of the plurality of second intermediate bridges may cause the second opening 442a and a second opening 742e disposed in the first direction with respect to the second opening 442a to be spaced apart. The second layer 442 may further include a plurality of second openings 742e spaced apart in the third direction and/or the fourth direction from the second opening 742e disposed in the first direction with respect to the second opening 442a. The second layer 442 may include a plurality of second openings spaced apart from each other in the first direction and/or the third direction. The second layer 442 may include a plurality of second intermediate bridges to space each of the plurality of second openings apart from each other in the direction parallel to the first direction.

Referring to FIGS. 7A and 7B, the second layer 442 may include a plurality of second openings 442a, 742a, 742c, and 742e partially overlapping each of the first openings 441a, 741a, 741c and 741e included in the first layer 441 in the first flexible region 440b'. Referring to FIG. 7B, in the first flexible region 440b', a first bridge 441b in contact with one end 441a' of one first openings 441a among the first openings 441a, 741a, 741c, and 741e disposed in the first layer 441 may partially overlap one second opening 442a of the second openings 442a, 742a, 742c, and 742e disposed in the second layer 442. A part of the first bridge 441b may overlap one second bridge 442b in contact with one end 442a' of the second opening 442a. The remaining part of the first bridge 441b may be exposed through the second opening 442a, when the second layer 442 is viewed from above. Since one end 442a' of the second opening 442a is in contact with the rest of the first bridge 441b, the first opening 441a may partially overlap the second opening 442a. For example, in the first flexible region 440b', another first bridge 741b in contact with the other end 441a" of the first opening 441a may be partially overlapped with another second bridge 742b in contact with the other end 442a" of the second opening 442a. Since the other end 441a" of the first opening 441a overlaps the other second bridge 742b, the first opening 441a may partially overlap the second opening 442a. Such an overlapping portion of the first bridge 441b and the second bridge 442b can reinforce the rigidity of the first layer 441 and the second layer 442, thereby reducing the deflection (or sagging) of the surface of the support plate 440. Due to the overlap between the bridges 441b and 442b disposed on different layers, an area of the overlapping portion of the openings of the different layers can increase. Owing to increasing the overlapping area of the openings, it is possible to secure necessary ductility in the deformable region (e.g., the second region 230b of FIG. 3B and the deformable region 430b of FIG. 4A) of the support plate 440.

Referring back to FIGS. 7A and 7C, in the first flexible region 440b', one first bridge 441b in contact with one end 441a' of one first opening 441a may be in contact with one end 442a' of one second opening 442a, when viewing the second layer 442 from above, and all of the first bridge 441b may be exposed. One end 441a' of the first opening 441a is in contact with the first bridge 441b, and is exposed by the second opening 442a when the second layer 442 is viewed from above, and thus, the first opening 441a may partially overlap the second opening 442a.

According to an embodiment, in the first flexible region 440b', the other first bridge 741b in contact with the other end 441a" of the first opening 441a may come into contact with another second bridge 742b in contact with the other end 442a" of the second opening 442a, when the second layer 442 is viewed from above. When the second layer 442 is viewed from above, the entirety of the other first bridge 741b may be exposed by the second opening 742c disposed in the third direction (e.g., +x direction) with respect to the one second opening 442a. The first opening 441a may overlap the other second bridge 742b. The second opening 442a may overlap one first bridge 441b in contact with one end 441a' of the first opening 441a. A distance d4 from one end 441a' of the first opening 441a to the other second bridge 742b may be different from a distance d3 that is the length of the first opening 441a. For example, the distance d3 from one end 441a' of the first opening 441a to the other end 441a" of the first opening 441a may be different from the distance d4 from the one end 441a' of the first opening 441a to the other end 442a" of the second opening 442a close to the other end 441a" of the first opening 441a, amongst both ends of one second opening 442a of a plurality of second openings overlapping the first opening 441a. The distance d3 from one end 441a' of the first opening 441a to the other end 441a" of the first opening 441a may correspond to the length in the third direction (e.g., the +x direction) of the first opening 441a. The distance d4 from the one end 441a' of the first opening 441a to the other end 442a" of the second opening 442a close to the other end 441a" of the first opening 441a, amongst both ends of one second opening 442a of a plurality of second openings overlapping the first opening 441a, may correspond to the distance from one end 441a' of the first opening 441a to another second bridge 742b overlapping the first opening 441a. When the other second bridge 742b is disposed to overlap the first opening 441a, the distance d4 may be shorter than the distance d3.

According to an embodiment, a length of each of the plurality of first openings in the third direction (e.g., +x direction) may be substantially the same as that of each of the plurality of second openings in the third direction. For example, one first opening 441a of the first openings 441a, 741a, 741c, and 741e may overlap one second opening 442a of the second openings 442a, 742a, 742c, and 742e. The distance d3 from one end 441a' of the first opening 441a to the other end 441a" of the first opening 441a may be substantially the same as a distance d5 from one end 442a' of the second opening 442a to the other end 442a" of the second opening 442a. For example, the length of each of the first openings 441a, 741a, 741c, and 741e in the third direction (e.g., +x direction) may be substantially equal to each other as the distance d3. The length of each of the second openings 442a, 742a, 742c, and 742e in the third direction may be substantially equal to each other as the distance d5. The length of each of the first openings 441a, 741a, 741c, and 741e in the third direction may be substantially equal to the length of each of the second openings 442a, 742a, 742c, and 742e in the third direction. However, the disclosure is not limited thereto, and the length of each of the plurality of first openings included in the plurality of flexible regions in the third direction may be different from that of each of the plurality of second openings included in the plurality of flexible regions in the third direction.

According to an embodiment, the width of each of the plurality of first openings in the first direction (e.g., +y direction) perpendicular to the third direction (e.g., +x direction) may be substantially the same as the width in the first direction of each of the plurality of second openings. For example, the width of one first opening 441a in the first direction (e.g., +y direction) may correspond to the width in the first direction of one first bridge 441b in contact with the first opening 441a. The width of one second opening 442a in the first direction may correspond to the width in the first direction of one second bridge 442b in contact with the second opening 442a. The width of the first bridge 441b in the first direction may be substantially the same as the width of the second bridge 442b in the first direction. The width of the first opening 441a in the first direction may be substantially the same as the width of the second opening 442a in the first direction. The disclosure is not limited thereto, and the width in the first direction of each of the plurality of first bridges in contact with each of the plurality of first openings may be substantially the same as the width in the first direction of each of the plurality of second bridges in contact with each of the plurality of second openings. Since the width of each of the plurality of first bridges in the first direction is the same as the width of each of the plurality of second bridges in the first direction, the width of each of the plurality of first openings in the first direction may be substantially the same as the width in the first direction of each of the plurality of second openings.

According to the above-described embodiment, the support plate 440 may include a plurality of first openings (e.g., the first openings 441a, 741a, 741c, and 741e) and a plurality of second openings (e.g., the second openings 442a, 742a, 742c, and 742e) partially overlapping each of the plurality of first openings, in a plurality of flexible regions (e.g., the first flexible regions 440b' and the second flexible regions 440b"), thereby reinforcing the rigidity to support the deformable region 430b of the display 430 supported by the plurality of flexible regions. A plurality of first bridges (e.g., the first bridges 441b, 741b, and 741d) to space apart each of the plurality of first openings may partially overlap a plurality of second bridges (e.g., the second bridges 442b, 742b, and 742d) to space apart each of the plurality of second openings, thereby reinforcing the supporting rigidity of the deformable region 430b.

Figure 7D:
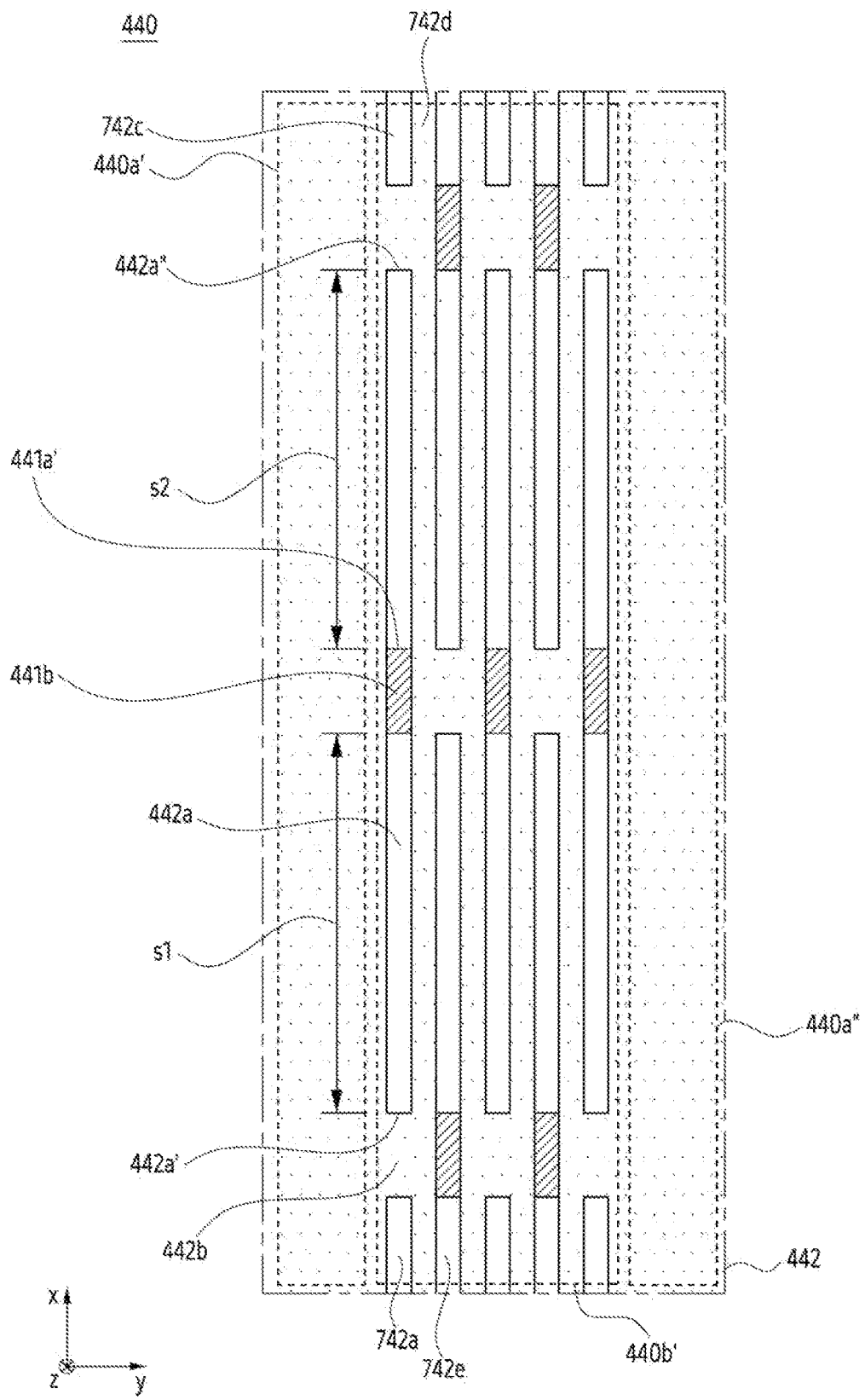
Figure 7E:
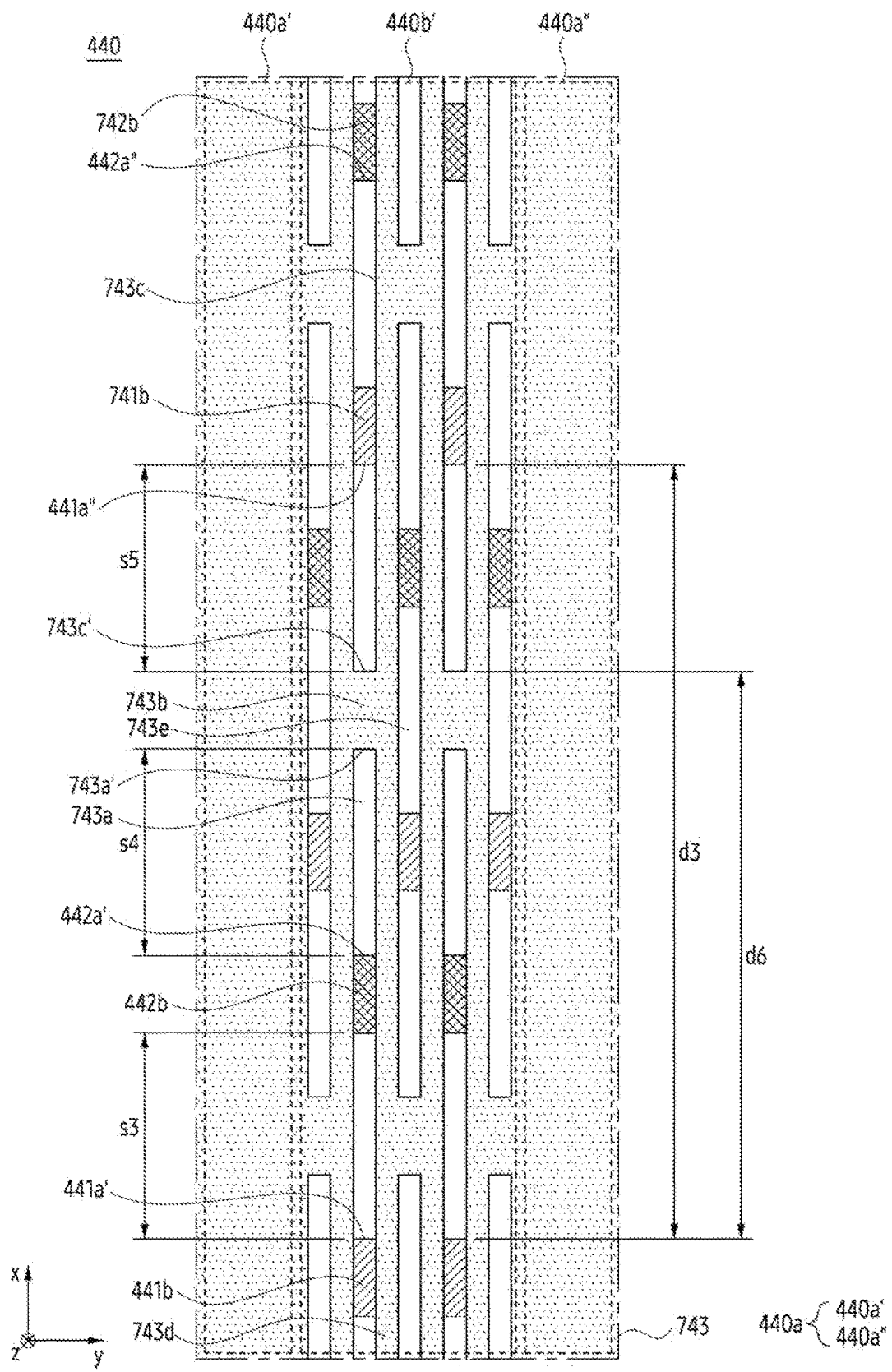

FIGS. 7D and 7E are front views of a display support structure of an electronic device according to an embodiment.

Referring to FIG. 7D, the support plate 440 may include rigid regions 440a' and 440a" and flexible regions 440b' and 440b" (e.g., the first flexible region 440b' and the second flexible region 440b" of FIG. 6B) disposed between the rigid regions 440a' and 440a". The support plate 440 may include a first layer (e.g., the first layer 441 of FIG. 7A) and a second layer 442 (e.g., the second layer 442 of FIG. 7A). The first layer 441 may include first openings (e.g., the first openings 441a, 741a, 741c and 741e of FIG. 7A) extending in the third direction (e.g., +x direction) in the first flexible region 440b'. The second layer 442 may be disposed on the first layer 441 and include second openings 442a, 742a, 742c, and 742e. The first layer 441 may include first bridges (e.g., the first bridges 441b, 741b, and 741d of FIG. 7A) to get the first openings 441a, 741a, 741c, and 741e to be spaced apart from each other. The second layer 442 may include second bridges 442b, 742b, and 742d to get the second openings 442a, 742a, 742c, and 742e to be space apart from each other.

According to an embodiment, the second layer 442 may include a plurality of second openings 442a, 742a, 742c, and 742e partially overlapping each of the first openings 441a, 741a, 741c, and 741e included in the first layer 441, in the first flexible region 440b'. For example, in the first flexible region 440b', the first layer 441 may include one first opening (e.g., one first opening 441a of FIG. 7A) of the first openings 441a, 741a, 741c, and 741e. When the second layer 442 is viewed from above, one first bridge 441b in contact with one end 441a' of the first opening 441a may be exposed by one second opening 442a of the second openings 442a, 742a, 742c, and 742e.

According to an embodiment, a distance s1 from one end 442a' of the one second opening 442a to the first bridge 441b may be substantially the same as a distance s2 from the other end 442a" of the second opening 442a to the first bridge 441b. For example, when the second layer 442 is viewed from above, one end of one first bridge 441b may face one end 442a' of one second opening 442a, and the other end of the first bridge 441b may be directed to the other end 442a" of the second opening 442a. The other end of the first bridge 441b may be in contact with one end 441a' of one first opening 441a.

Heretofore, although it has been described that the distance from both ends of the second opening 442a to the first bridge 441b is substantially the same, the disclosure is not limited thereto, and the distance s1 and the distance s2 may be different from each other.

Referring to FIG. 7E, the support plate 440 may further include a third layer 743. The third layer 743 may be disposed on the second layer 442 and may include third openings 743a, 743c, and 743e in the first flexible region 440b'. The third layer 743 may include third bridges 743b and 743d to space apart each of the third openings 743a, 743c, and 743e. The third layer 743 may have a configuration substantially the same as or similar to that of the second layer 442. For example, the third layer 743 may include one third opening 743a of the third openings 743a, 743c, and 743e and one third bridge 743b in contact with one end 743a' of the one third opening 743a. The third layer 743 may further include a third opening 743c disposed in the third direction (e.g., +x direction) with respect to the one third opening 743a. The one third opening 743a and the third opening 743c disposed in the third direction with respect to the one third opening 743a may be spaced apart by the one third bridge 743b. The third layer 743 may include a plurality of third intermediate bridges extending in the third direction and a third opening 743e disposed in the first direction (e.g., +y direction) with respect to the one third opening 743a. The one third opening 743a and the third opening 743e disposed in the first direction (e.g., +y direction) with respect to the one third opening 743a may be spaced apart by a third intermediate bridge 743d of one of the plurality of third intermediate bridges. The disclosure being not limited thereto, the third layer 743 may include a plurality of third openings respectively spaced apart from each other in the direction parallel to the first direction and/or in the direction parallel to the third direction. The third layer 743 may include a plurality of third intermediate bridges to space the plurality of third openings apart from each other in the direction parallel to the first direction.

According to an embodiment, one third opening 743a of the third openings 743a, 743c, and 743e included in the third layer 743 may partially overlap one first opening 441a of the first openings 441a, 741a, 741c, and 741e facing the third direction (e.g., the +x direction), in the first flexible region 440b'. The third opening 743a may partially overlap one second opening 442a of the second openings 442a, 742a, 742c, and 742e. The one third opening 743a may overlap one first bridge 441b in contact with one end 441a' of the first opening 441a and one second bridge 442b in contact with one end 442a' of the second opening 442a. The distance d3 from one end 441a' of the first opening 441a to the other end 441a" of the first opening 441a may be different form a distance d6 from one end 441a' of the first opening 441a to one end of the third opening close to the other end 441a" of the first opening 441a, amongst both ends of one third opening of the third openings 743a, 743c, and 743e overlapping the first opening 441a. For example, one first opening 441a of the first openings 441a, 741a, 741c, and 741e may respectively partially overlap one third opening 743a of the third openings 743a, 743c, and 743e and a third openings 743c disposed in the third direction (e.g., +x direction) with respect to the one third opening 743a. One end 441a' of the first opening 441a may be exposed by the one third opening 743a, when the third layer 743 is viewed from above. The other end 441a" of the first opening 441a may be exposed by the third opening 743c disposed in the third direction (e.g., +x direction) with respect to the one third opening 743a, when the third layer 743 is viewed from above. Among the third openings 743a, 743c, and 743e, one end 743c' of the third opening 743c disposed in the third direction (e.g., +x direction) with respect to the one third opening 743a may be an end close to the other end 441a" of the first opening 441a. The distance d3 from one end 441a' of the first opening 441a to the other end 441a" of the first opening 441a may be different from a distance d6 from one end 441a' of the first opening 441a to one end 743c' of the third opening 743c disposed in the third direction (e.g., +x direction) with respect to the one third opening 743a.

According to an embodiment, the third layer 743 may include one third bridge 743b in contact with one end 743a' of one third opening 743a. The one third bridge 743b may overlap one first opening 441a and one second opening 442a. The first layer 441 may include one first bridge 441b in contact with one end 441a' of the first opening 441a, and another first bridge 741b in contact with the other end 441a" of the first opening 441a. The second layer 442 may include one second bridge 442b in contact with one end 442a' of the one second opening 442a. According to an embodiment, the distance s3 from the first bridge 441b to the second bridge 442b may be substantially the same as the distance s4 from the second bridge 442b to the one third bridge 743b. The distance s3 from the first bridge 441b to the second bridge 442b may be substantially the same as the distance s5 from the one third bridge 743b to the other first bridge 741b. The distance s5 from the one third bridge 743b to the other first bridge 741b may be a distance s5 to the other end 441a" of the first opening 441a facing one end 441a' of the first opening 441a. For example, a first bridge 441b in contact with one end 441a' of a first opening 441a and a second bridge 442b in contact with one end 442a' of a second opening 442a may be exposed through a third opening 743a, when the third layer 743 is viewed from above. Another first bridge 741b in contact with the other end 441a" of the first opening 441a and another second bridge 742b in contact with the other end 442a" of the second opening 442a may be exposed through a third opening 743c disposed in the third direction (e.g., +x direction) with respect to the one third opening 743a, when the third layer 743 is viewed from above. The third opening 743a, and the third opening 743c disposed in the third direction (e.g., +x direction) with respect to the third opening 743a may be spaced apart by the third bridge 743b.

Heretofore, although it has been described that when the third layer 743 is viewed from above, the bridges 441b, 442b, 743b, and 741b are spaced apart at equal intervals, the disclosure is not limited thereto, and the distance s3, distance s4 and the distance s5 may be different from each other.

According to an embodiment, in regions corresponding to the rigid regions 440a' and 440a", an adhesive member (e.g., the adhesive member 640 of FIG. 6A) may be disposed in between the second layer 442 and the third layer 743. For example, the adhesive member 640 may be disposed between the first layer 441 and the second layer 442 in the region corresponding to the rigid regions 440a' and 440a". The adhesive member 640 may be disposed between the second layer 442 and the third layer 743 in the region corresponding to the rigid regions 440a' and 440a" to connect the first layer 441, the second layer 442, and the third layer 743 in the support plate 440.

According to the above-described embodiment, in a plurality of flexible regions (e.g., the first flexible region 440b' and the second flexible region 440b"), the support plate 440 may include a plurality of first openings (e.g., first openings 441a, 741a, 741c, and 741e), a plurality of second openings (e.g., the second openings 442a, 742a, 742c, and 742e) partially overlapping each of the plurality of first openings, and a plurality of third openings (e.g., the third openings 743a, 743c, and 743e) partially overlapping each of the plurality of first openings or the plurality of second openings, thereby reinforcing the supporting rigidity of the deformable region (e.g., the second region 230b of FIG. 3B or the deformable region 430b of FIG. 4A) of the display (e.g., the display module 160 of FIG. 1, the display 230 of FIG. 2A, or the display 430 of FIG. 4A) supported by the plurality of flexible regions. A plurality of bridges included in each of the different layers (e.g., first bridges 441b, 741b and 741d, second bridges 442b, 742b and 742d, and third bridges 743b and 743d) may be arranged being spaced apart from each other, so that the rigidity of the support plate 440 can be reinforced while securing the ductility of the deformation region 430b.

Figure 8A:
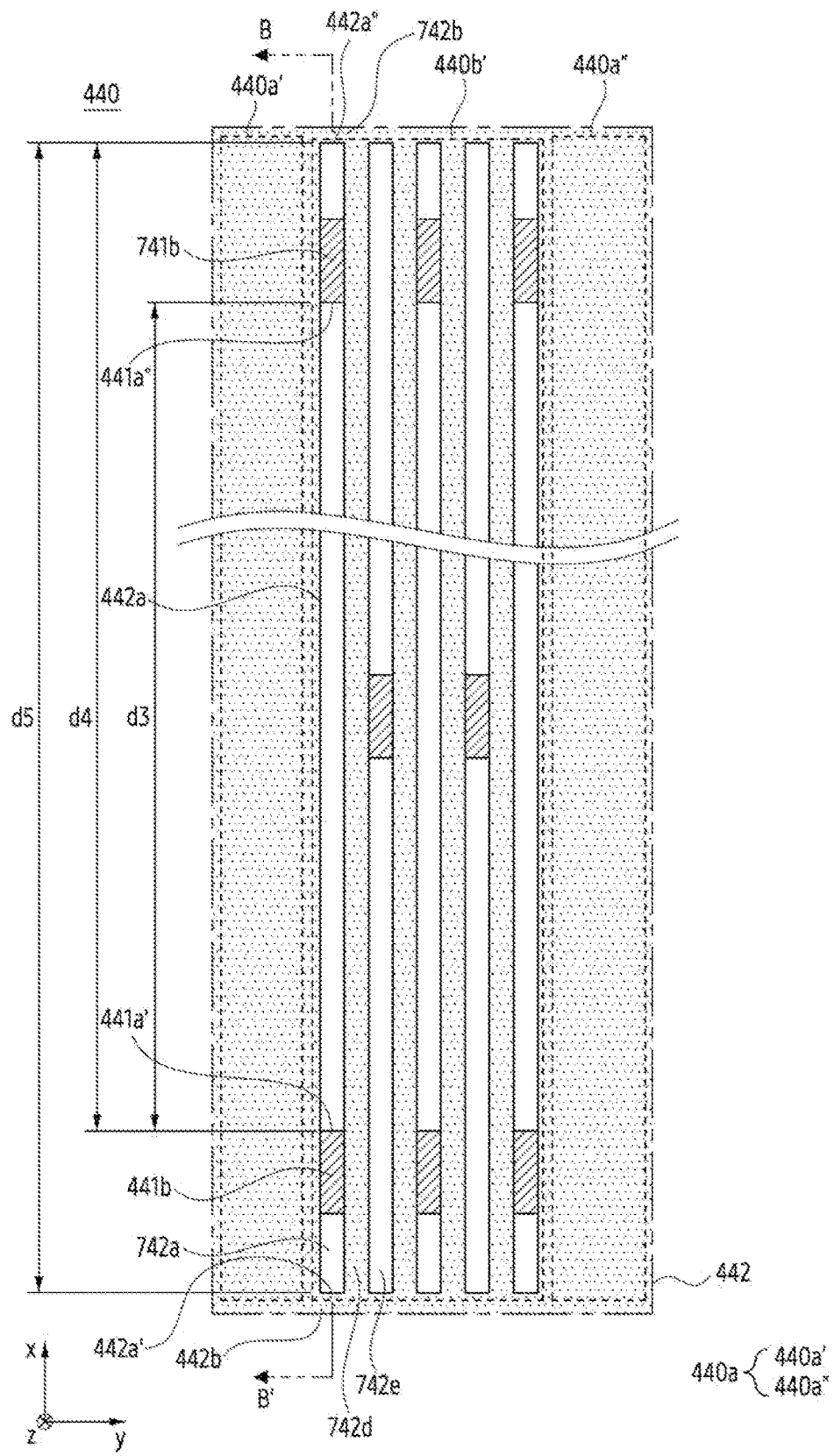
FIG. 8A is a front view of a display support structure of an electronic device according to an embodiment.
Figure 8B:
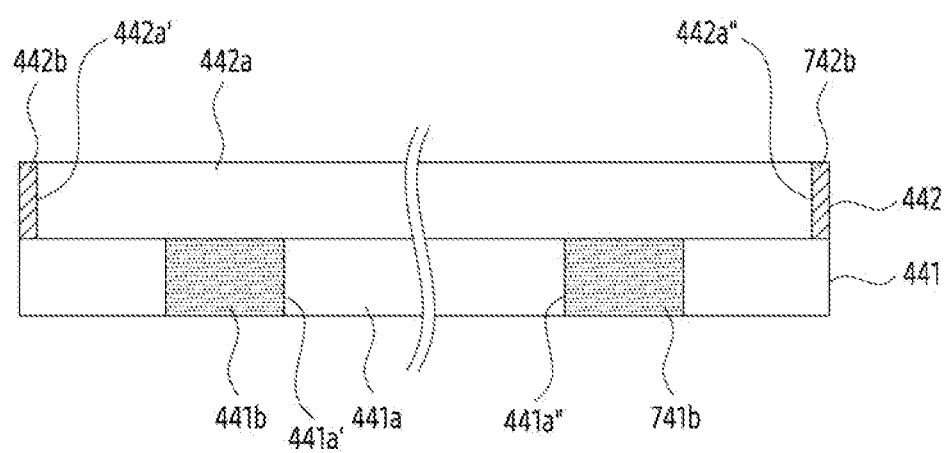
FIG. 8B is a cross-sectional view illustrating an example of a display support structure of an electronic device taken along a line B-B' of FIG. 8A, according to an embodiment.
Figure 8B:
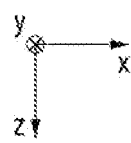
Figure 9A:
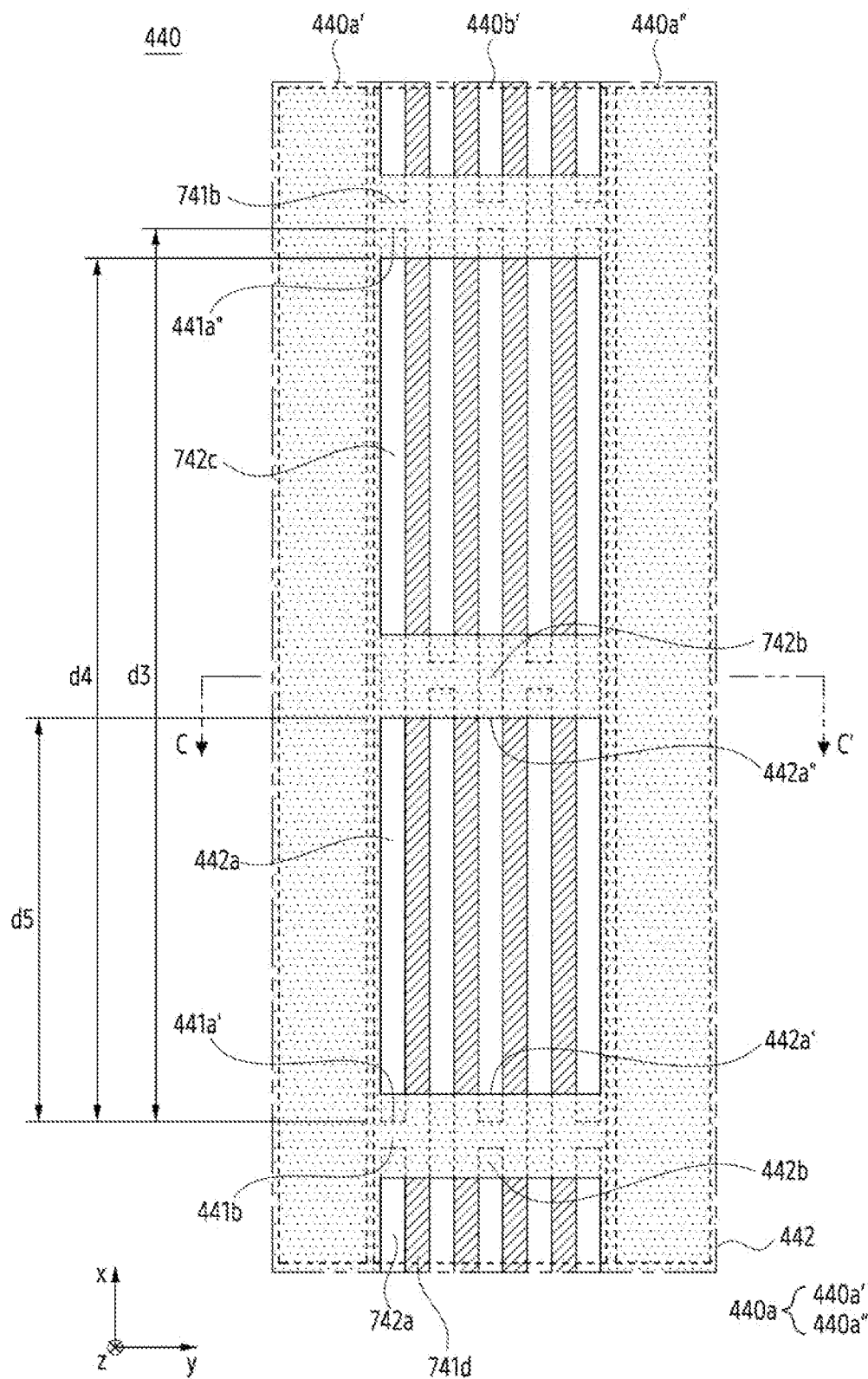
FIG. 9A is a front view of a display support structure of an electronic device according to an embodiment.
Figure 9B:
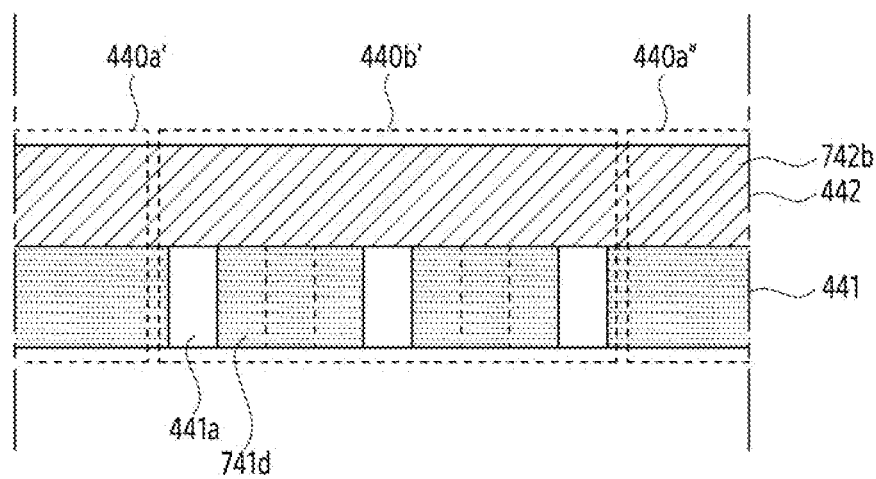
FIG. 9B is a cross-sectional view illustrating an example of a display support structure of an electronic device taken along a line C-C' of FIG. 9A, according to an embodiment.
Figure 9B:
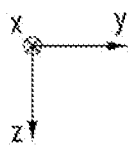

FIG. 8A is a front view of a display support structure of an electronic device according to an embodiment. FIG. 8B is a cross-sectional view illustrating an example of a display support structure of an electronic device taken along a line B-B' of FIG. 8A according to an embodiment. FIG. 9A is a front view of a display support structure of an electronic device according to an embodiment. And FIG. 9B is a cross-sectional view illustrating an example of a display support structure of an electronic device taken along a line C-C' of FIG. 9A according to an embodiment.

Referring to FIGS. 8A, 8B, 9A and 9B, the support plate 440 may include the rigid regions 440a' and 440a" and flexible regions (e.g., the first flexible region 440b' and the second flexible region 440b" of FIG. 6B) disposed between the rigid regions 440a' and 440a". The support plate 440 may include a first layer 441 and a second layer 442. The first layer 441 may include a plurality of first openings extending in the third direction (e.g., +x direction) in the first flexible region 440b'. The first layer 441 may include a plurality of first bridges to space the plurality of first openings apart from each other. The second layer 442 may be disposed on the first layer 441 and include a plurality of second openings. The second layer 442 may include second bridges to space the plurality of second openings apart. The first bridges 441b, 741b and 741d, the second openings 442a, 742a, 742c and 742e, and the second bridges 442b, 742b and 742d may respectively correspond to the first bridges 441b, 741b and 741d, the second openings 442a, 742a, 742c and 742e, and the second bridges 442b, 742b and 742d of FIGS. 7A to 7E.

According to an embodiment, the second layer 442 may include a plurality of second openings each fully overlapping each of a plurality of first openings included in the first layer 441 in the first flexible region 440b'. For example, referring to FIGS. 8A and 8B, in a region corresponding to the first flexible region 440b', the second layer 442 may include a plurality of second bridges disposed on both peripheries extending in the direction parallel to the first direction (e.g., +y direction). One second bridge 442b of the plurality of second bridges may be in contact with one end 442a' of one second opening 442a, and another first bridge 741b may be in contact with the other end 442a" of the second opening 442a. The second bridge 442b and the other second bridge 742b may be respectively disposed on both peripheries of the second layer 442 extending in the direction parallel to the first direction. When the second layer 442 is viewed from above, one first bridge 441b in contact with the one end 441a' of one first opening 441a and the other first bridge 741b in contact with the other end 441a" of the first opening 441a may be entirely exposed through the second opening 442b. The first opening 441a may entirely overlap the second opening 442a. The disclosure is not limited thereto, and each of the plurality of first openings may entirely overlap each of the plurality of second openings in the region corresponding to the plurality of flexible regions.

According to an embodiment, the second layer 442 may include a plurality of second openings partially overlapping each of the plurality of first openings included in the first layer 441, in the first flexible region 440b'. For example, referring to FIGS. 9A and 9B, a plurality of second intermediate bridges (e.g., a second intermediate bridge 742d in FIG. 7A) in a region corresponding to the first flexible region 440b' may be omitted. The plurality of second bridges in the first flexible region 440b' may each extend in the direction parallel to the first direction (e.g., +y direction) to connect the rigid regions 440a' and 440a". A portion of one first opening 441a among the plurality of first openings may overlap one second opening 442a. The remaining portion of the first opening 441a may overlap the second opening 742c disposed in the third direction (e.g., +x direction) with respect to the second opening 442a. For example, each of the plurality of first bridges may entirely overlap the plurality of second bridges. Since each of the plurality of first bridges is in contact with one end of each of the plurality of first openings, each of the plurality of first openings may partially overlap each of the plurality of second bridges spaced apart by the plurality of second bridges.

According to an embodiment, one end 441a' of one first opening of the plurality of first openings 441a may be closer to one end 442a' of both ends of one second opening 442a partially overlapping the first opening 441a. The other end 441a" of the first opening 441a may be closer to the other end 442a" of both ends of the second opening 442a. The distance d3 from one end 441a' of the first opening 441a to the other end 441a" of the first opening 441a may be different from the distance d4 from the one end 441a' of the first opening 441a to the other end 442a" of the second opening 442a close to the other end 441a" of the first opening 441a, amongst both ends of one second opening 442a of a plurality of second openings overlapping the first opening 441a. For example, referring to FIGS. 8A and 8B, one end 441a' of one first opening 441a may be close to one end 442a' of both ends of one second opening 442a, and the other end 441a" of the first opening 441a may be close to the other end 442a" of both ends of the second opening 442a. The distance d3 from one end 441a' of the first opening 441a to the other end 441a" of the first opening 441a corresponds to a length in the third direction (e.g., +x direction) of the first opening 441a, and thus, the distance d3 may be different from the distance d4 from one end 441a' of the first opening 441a to the other end 442a" of the second opening 442a close to the other end 441a" of the first opening 441a. For example, referring to FIGS. 9A and 9B, one end 441a' of the first opening 441a may be close to one end 442a' of one second opening 442a, and the other end 441a" of the first opening 441a may be close to one end of the second opening 742c disposed in the third direction (e.g., +x direction) with respect to the second opening 442a. Since the second opening 442a and the second opening 742c disposed in the third direction with respect to the second opening 442a are spaced apart from each other in the third direction, the distance d3 from one end 441a' of the first opening 441a to the other end 441a" of the first opening 441a may be different from the distance to d4 from one end 441a' of the first opening 441a to one end of the second opening 742c disposed in the third direction with respect to the second opening 442a, close to the other end 441a" of the first opening 441a.

According to an embodiment, the first layer 441 may include a first bridge 441b in contact with one end 441a' of a first opening 441a, and the second layer 442 may include a second bridge 442b in contact with one end 442a' of a second opening 442a. The distance d3 from the other end 441a" of the first opening 441a to the first bridge 441b may be different from the distance d5 from the other end 442a" of the second opening 442a to the second bridge 442b. For example, referring to FIGS. 8A and 8B, a first bridge 441b in contact with one end 441a' of a first opening 441a and another first bridge 741b in contact with the other end 441a" of the first opening 441a may be fully exposed through the second opening 442a. Since both ends of the first opening 441*a* are fully exposed through the second opening 442*a*, the distance d3 from the other end 441*a*" of the first opening 441*a* to the first bridge 441*b* may be different from the distance d5 from the other end 442*a*" of the second opening 442*a* to the second bridge 442*b*. For example, referring to FIGS. 9A and 9B, a second opening 442*a* and a second opening 742*c* disposed in the third direction (e.g., +x direction) with respect to the second opening 442*a* may partially overlap the first opening 441*a*, respectively. One end 441*a*' of the first opening 441*a* is close to one end 442*a*' of the second opening 442*a*, and the other end 441*a*" of the first opening 441*a* is close to one end of the second opening 742*c* disposed in the third direction with respect to the second opening 442*a*, so the distance d3 from the other end 441*a*" of the first opening 441*a* to the first bridge 441*b* may be different from the distance d5 from the other end 442*a*" of the second opening 442*a* to the second bridge 442*b*.

According to the above-described embodiment, in a plurality of flexible regions (e.g., the first flexible region 440*b*' and the second flexible region 440*b*"), the support plate 440 includes a plurality of first openings (e.g., the first openings 441*a*, 741*a*, 741*c*, and 741*e*) and a plurality of second openings (e.g., the second openings 442*a*, 742*a*, 742*c*, 742*e*) partially and/or fully overlapping each of the plurality of first openings, so that the display (e.g., the display module 160 of FIG. 1, the display 230 of FIG. 2A, or the display 430 of FIG. 4A) supported by the plurality of flexible regions can be reinforced with more rigidity to support the deformable region (e.g., the second region 230*b* of FIG. 3B, or the deformable region 430*b* of FIG. 4A). The plurality of first bridges (e.g., the first bridges 441*b*, 741*b*, and 741*d*) to space the plurality of first openings apart from each other can be partially and/or fully overlapped with the plurality of bridges (e.g., the second bridges 442*b*, 742*b*, and 742*d*) spacing apart the plurality of second openings from each other, thereby reinforcing the supporting rigidity for the deformable region 430*b*.

Figure 10:
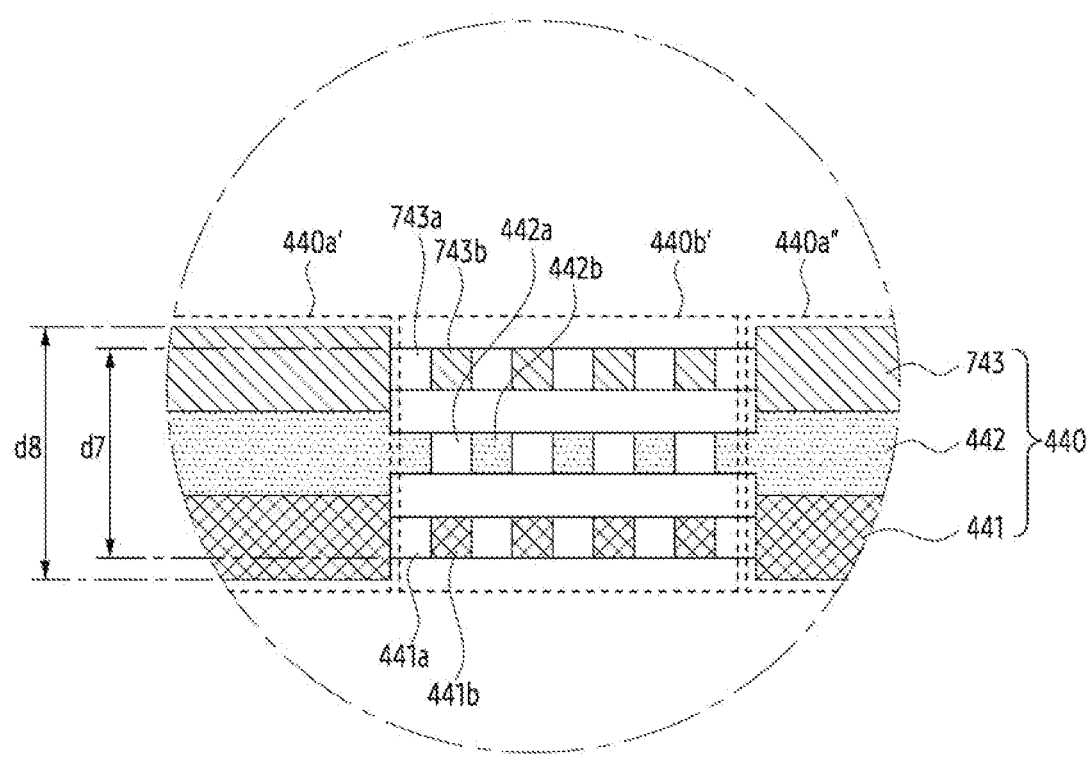
FIG. 10 is a side view of a display support structure of an electronic device according to an embodiment.

FIG. 10 is a side view of a display support structure of an electronic device according to an embodiment.

Referring to FIG. 10, the support plate 440 may include rigid regions 440*a*' and 440*a*" and flexible regions (e.g., the first flexible region 440*b*' and the second flexible region 440*b*" of FIG. 6B) disposed between the rigid regions. The support plate 440 may include a first layer 441, a second layer 442, and a third layer 743. The first layer 441 may include a plurality of first openings (e.g., the first openings 441*a*, 741*a*, 741*c*, and 741*e* of FIG. 7A) extending in the third direction (e.g., +x direction) in the first flexible region 440*b*'. The second layer 442 may be disposed on the first layer 441 and include a plurality of second openings (e.g., the second openings 442*a*, 742*a*, 742*c*, and 742*e* of FIG. 7A). The third layer 743 may be disposed on the second layer 442 and include a plurality of third openings (e.g., the third openings 743*a*, 743*c*, and 743*e* of FIG. 7E). The first layer 441 may include a plurality of first bridges (e.g., the first bridges 441*b*, 741*b*, and 741*d* of FIG. 7A) spacing the plurality of first openings apart. The second layer 442 may include a plurality of second bridges (e.g., the second bridges 442*b*, 742*b*, and 742*d* of FIG. 7A) spacing the plurality of second openings apart. The third layer 743 may include third bridges (e.g., the third bridges 743*b* and 743*d* of FIG. 7E) spacing the plurality of third openings apart. The disclosure is not limited thereto, and the support plate 440 may include a plurality of overlapping layers, when the support plate 440 is viewed from above.

According to an embodiment, the thickness d7 of the first flexible region 440*b*' may be less than or equal to the thickness d8 of the rigid regions 440*a*' and 440*a*". For example, in the first flexible region 440*b*', the first layer 441 may include a first bridge 441*b* in contact with a first opening 441*a*, the second layer 442 may include a second bridge 442*b* in contact with a second opening 442*a*, and the third layer 743 may include a third bridge 743*b* in contact with a third opening 743*a*. The thickness of the first layer 441 included in the rigid regions 440*a*' and 440*a*" may be substantially the same as the thickness of the first bridge 441*b* or may be thicker than the thickness of the first bridge 441*b*. The thickness of the second layer 442 included in the rigid regions 440*a*' and 440*a*" may be substantially the same as the thickness of the second bridge 442*b* or may be thicker than the thickness of the second bridge 442*b*. The thickness of the third layer 743 included in the rigid regions 440*a*' and 440*a*" may be substantially the same as the thickness of the third bridge 743*b* or may be thicker than the thickness of the third bridge 743*b*. The sum of the thicknesses of the bridges 441*b*, 442*b*, and 743*b* may be substantially as the thickness d8 of the rigid regions 440*a*' and 440*a*", or may be thinner than the thickness d8 of the rigid regions 440*a*' and 440*a*". The thickness of the support plate 440 included in the plurality of rigid regions may be substantially equal to or greater than the thickness of each of the plurality of flexible regions disposed between the plurality of rigid regions.

According to the above-described embodiment, the support plate 440 may be disposed between a plurality of rigid regions (e.g., the first rigid region 440*a*' and the second rigid region 440*a*"), and include a plurality of flexible regions (e.g., the first flexible regions 440*b*' and the second flexible regions 440*b*") thinner than the plurality of rigid regions. The support plate 440 can reinforce, through the plurality of layers 441, 442, and 743, the rigidity of the deformable region (e.g., the second region 230*b* of FIG. 3B and the deformable region 430*b* of FIG. 4A) of the display (e.g., the display module 160 of FIG. 1, the display 230 of FIG. 2A, or the display 430 of FIG. 4A). The support plate 440 can provide elasticity or flexibility when deformed into shape according to the deformation of the display 430, through the first flexible region 440*b*' having a thickness smaller than that of the rigid regions 440*a*' and 440*a*".

Figure 11A:
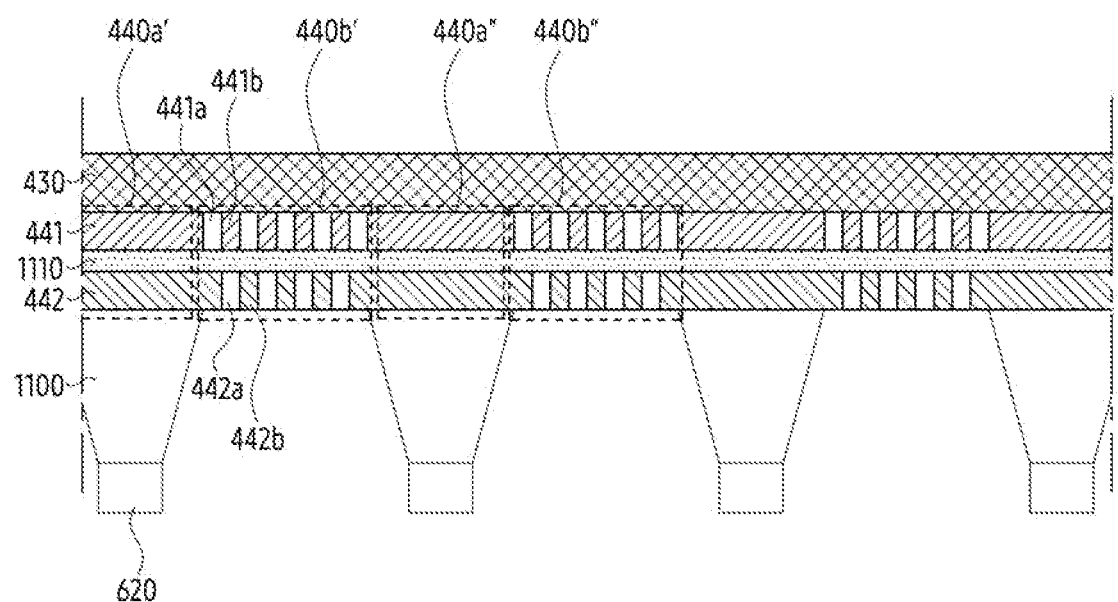
FIGS. 11A and 11B are side views illustrating a display structure of an electronic device according to an embodiment.
Figure 11A:
Figure 11B:
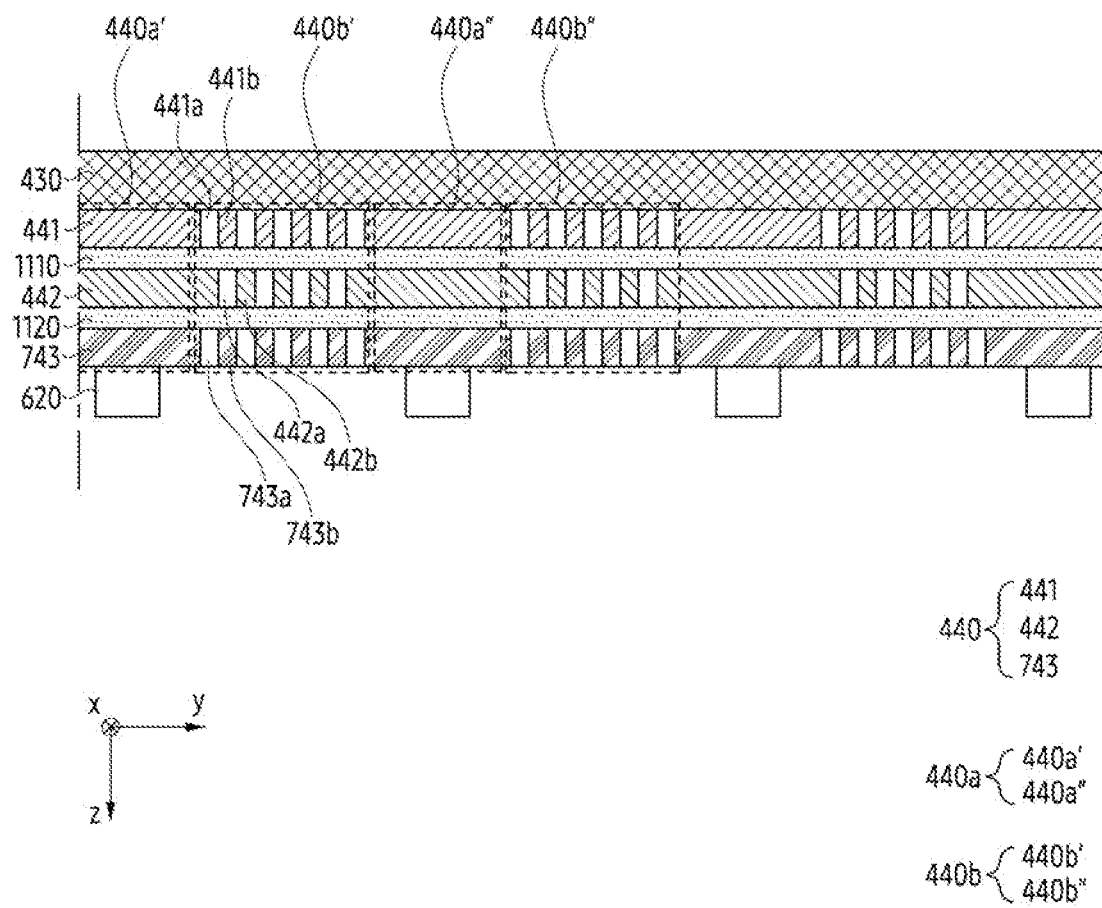

FIGS. 11A and 11B are side views illustrating a display structure of an electronic device according to an embodiment.

Referring to FIG. 11A, an electronic device (e.g., the electronic device 101 of FIG. 1, the electronic device 200 of FIG. 2A, or the electronic device 400 of FIG. 4A) may include a display 430, a support plate 440, at least one gear head 620, and at least one support bar 1100. The support plate 440 may include a plurality of rigid regions (e.g., the first rigid regions 440*a*' and the second rigid regions 440*a*") and a plurality of flexible regions (e.g., the first flexible region 440*b*' and the second flexible region 440*b*") disposed between the plurality of rigid regions. The support plate 440 may include a first layer 441, a second layer 442 and a first reinforcement layer 1110.

According to an embodiment, the at least one support bar 1100 may be configured to support the support plate 440. When the display 430 is viewed from above, the at least one support bar 1100 may overlap each of the plurality of rigid regions. One surface of the at least one support bar 1100 may be in contact with the support plate 440 included in the plurality of rigid regions, and the other surface facing the one surface of the at least one support bar 1100 may be in contact with at least one gear head 620. For example, the support plate 440 may include a first layer 441 in a direction toward the inside of the electronic device 400 and a second layer 442 disposed on the first layer 441. At least one support bar 1100 may be disposed on one surface facing the inside of the electronic device 400 and corresponding to the rigid regions 440a' and 440a" of the second layer. At least one gear head 620 may be disposed on the other surface facing one surface of the at least one support bar 1100 in contact with the second layer.

According to an embodiment, the at least one gear head 620 may be disposed to overlap the at least one support bar 1100 when the display 430 is viewed from above. For example, each of the gear heads included in a first set of gear heads (e.g., a first set of gear heads 620a of FIG. 6A) may be in contact with a plurality of support bars disposed on a plurality of rigid regions. Each of the gear heads may overlap the plurality of support bars, when the display 430 is viewed from above.

According to an embodiment, the support plate 440 may further include a first reinforcement layer 1110 disposed between the first layer 441 and the second layer 442. The first reinforcement layer 1110 may include a continuous surface having a shape corresponding to one surface of the display 430 in a plurality of flexible regions. For example, in a region corresponding to the first flexible region 440b', the first layer 441 may include a first opening 441a and a first bridge 441b in contact with the first opening 441a, and the second layer 442 may include a second opening 442a and a second bridge 442b in contact with the second opening 442a. In a region corresponding to the first flexible region 440b', one surface of the first reinforcement layer 1110 may face the first opening 441a and the first bridge 441b, and the other surface facing the one surface of the first reinforcement layer 1110 may be directed to the second opening 442a and the bridge 442b. The one surface of the first reinforcement layer 1110 and the other surface facing the one surface may be continuous. The disclosure is not limited thereto, and in a region corresponding to the plurality of flexible regions of the support plate 440, the first reinforcement layer 1110 may be formed such that one surface facing the first layer 441 and the other surface facing the one surface toward the second layer 442 are substantially continuous.

According to an embodiment, the first reinforcement layer 1110 may be in contact with the first layer 441 and the second layer 442 in a region corresponding to the plurality of rigid regions. For example, in the region corresponding to the plurality of rigid regions (e.g., the first rigid region 440a' and the second rigid region 440a"), an adhesive member (e.g., the adhesive member 640 of FIG. 6A) may be disposed between one surface facing the first layer of the first reinforcement layer 1110 and the first layer 441. In the region corresponding to the plurality of rigid regions, an adhesive member 640 may be placed between another surface facing the one surface of the first reinforcement layer 1110 toward the second layer 442 and the first layer 441.

According to an embodiment, the first reinforcement layer 1110 may reinforce the rigidity of the support plate 440 or compensate for thermal properties of the support plate 440. For example, the first reinforcement layer 1110 may include a metal or a carbon fiber composite material to reinforce the rigidity of the support plate 440. The first reinforcement layer 1110 may include any one of titanium, GFRP, CFRP, or plastic. The first reinforcement layer 1110 may include a metal material having high thermal conductivity to transfer heat emitted from the display 430, in order to compensate for the thermal properties of the support plate 440, or the display 430, or a polymer material having low thermal conductivity, in order to reduce the heat transferred to the display 430.

According to an embodiment, the material of the first reinforcement layer 1110 may be different from that of the deformable region 430b in a planar area of the display 430 (e.g., the first region 230a in FIG. 3B or the planar region 430a in FIG. 4A). For example, the material of the first reinforcement layer 1110 in the deformable region 430b may have higher elasticity than the material of the first reinforcement layer 1110 in the planar region 430a. For example, the material of the first reinforcement layer 1110 in the planar region 430a may radiate more heat from the electronic device 400 than the material of the first reinforcement layer 1110 in the deformable region 430b, or may insulate more heat from the outside of the electronic device 400.

Heretofore, the description has been made on the basis of the first reinforcement layer 1110, but the disclosure is not limited thereto. The support plate 440 may include a plurality of reinforcement layers disposed between the plurality of layers. In the reinforcement layers, the material of the planar region 430a of the display 430 may be different from the material of the deformable region 430b thereof. The plurality of reinforcement layers can be made of various materials, so that the support plate 440 can protect the display 430 from external impact or environmental alteration and further improve the functionality of the display 430.

Referring to FIG. 11B, the support plate 440 may further include a third layer 743 and a second reinforcement layer 1120. According to an embodiment, as opposed to FIG. 11A, the support plate 440 may not include the support bar 1100. The third layer 743 and the second reinforcement layer 1120 may support the first layer 441, the second layer 442, the first reinforcement layer 1110 and the display 430, in place of the support bar 1100.

According to an embodiment, the at least one gear head 620 may be disposed on one surface of the third layer 743 facing the inside of the electronic device 400, in an area corresponding to the plurality of rigid regions. For example, each of the gear heads included in a first set of gear heads (e.g., the first set of gear heads 620a of FIG. 6A) may come into contact with one surface of a third layer 743 disposed on a plurality of rigid regions. Each of the gear heads may overlap each of the plurality of rigid regions, when the display 430 is viewed from above.

According to an embodiment, the second reinforcement layer 1120 may be disposed between the second layer 442 and the third layer 743. The second reinforcement layer 1120 may be configured substantially the same as or similar to the first reinforcement layer 1110. Similar to the first reinforcement layer 1110, the second reinforcement layer 1120 may include a continuous surface having a shape corresponding to one surface of the display 430 in a plurality of flexible regions. For example, in a region corresponding to the first flexible region 440b', the second layer 442 may include a second opening 442a and a second bridge 442b in contact with the second opening 442a, and the third layer 743 may include a third opening 743a and a third bridge 743b in contact with the third opening 743a. In a region corresponding to the first flexible region 440b', one surface of the second reinforcement layer 1120 may face the second opening 442a and the second bridge 442b, and another surface facing the one surface of the second reinforcement layer 1120 may be directed to the third opening 743a and the third bridge 743b. The one surface of the second reinforcement layer 1120 and the other surface facing the one surface may be continuous. The disclosure is not limited thereto, and in regions corresponding to the plurality of flexible regions of the support plate 440, the second reinforcement layer 1120 may be formed such that one surface facing the second layer 442 and the other surface facing the one surface toward the third layer 743 are continuous.

According to an embodiment, the second reinforcement layer 1120 may be in contact with the second layer 442 and the third layer 743, in a region corresponding to the plurality of rigid regions. For example, in the region corresponding to the plurality of rigid regions (e.g., the first rigid region 440a' and the second rigid region 440a"), an adhesive member 640 may be disposed between one surface facing the second layer 442 of the second reinforcement layer 1120 and the second layer 442. In the region corresponding to the plurality of rigid regions, an adhesive member 640 may be placed between the other surface facing the one surface of the second reinforcement layer 1120 and directing toward the third layer 743, and the third layer 743. According to the above-described embodiment, the electronic device 400 includes at least one support bar 1100 disposed in a plurality of rigid regions, thereby supporting at least one gear head 620 engaged with the guide gear (e.g., the guide gear 630 of FIG. 6A) and supporting the display 430. The support plate 440 can reinforce the rigidity to support the display 430 owing to having the plurality of reinforcement layers (e.g., the reinforcement layers 1110 and 1120) disposed between the plurality of layers. Since the support plate 440 includes a plurality of layers and a plurality of reinforcement layers disposed between the plurality of layers, the at least one support bar 1100 may be omitted. Omitting the at least one support bar 1100 makes it possible to provide the electronic device 400 with a space for accommodating an extended battery (e.g., the battery 610 of FIG. 6A). In a region corresponding to the plurality of rigid regions, more particularly, in the region where each of the plurality of layers is in contact with the reinforcement layers, corresponding to the plurality of flexible regions disposed between the plurality of rigid regions, each of the plurality of layers includes a continuous surface, so that the support plate 440 can increase the rigidity of supporting the deformable area (e.g., the second area 230b of FIG. 3B and the deformable area 430b of FIG. 4A) of the display 430.

According to the above-described embodiment, an electronic device (e.g., an electronic device 101 of FIG. 1, an electronic device 200 of FIG. 2A, or an electronic device 400 of FIG. 4A) may include a first housing (e.g., a first housing 210 of FIG. 2A or a first housing 410 of FIG. 4A), a second housing (e.g., a second housing 220 of FIG. 2A or a second housing 420 of FIG. 4A) coupled to the first housing so as to be slidable with respect to the first housing in a first direction (e.g., +y direction) and a second direction (e.g., +y direction) opposite to the first direction, a display (e.g., a display module 160 of FIG. 1, a display 230 of FIG. 2A, a display 430 of FIG. 4A) including a planar region (e.g., a first area 230a of FIG. 3B or a planar region 430a of FIG. 4A) disposed on the second housing and a deformable region (e.g., a second region 230b of FIG. 3B or a deformable region 430b of FIG. 4A) that contacts the planar region and is exposed to an outside as the second housing moves in the first direction or disposed in the first housing as the second housing moves in the second direction, and a support plate (e.g., a support plate 440 of FIG. 4A) configured to support the display. According to an embodiment, the support plate includes rigid regions (e.g., rigid regions 440a' and 440a" of FIG. 4A), a flexible region (e.g., a first flexible region 440b' of FIG. 4A) disposed between the rigid regions and including a plurality of openings spaced apart from each other and having a length in a third direction (e.g., +x direction) perpendicular to the first direction, a first layer (e.g., a first layer 441 of FIG. 4A) including a plurality of first openings extending in the third direction in the flexible region, and a second layer (e.g., a second layer 442 of FIG. 4A) disposed on the first layer and including a plurality of second openings partially overlapping each of the plurality of first openings in the flexible region. According to an embodiment, a distance (e.g., d3 in FIG. 7B) from one end (e.g., one end 441a' of one first opening of FIG. 7A) to another end (e.g., the other end 441a" of one first opening of FIG. 7A) of one first opening (e.g., one first opening 441a of FIG. 6A) of the plurality of first openings facing the third direction may be different from a distance (e.g., d4 of FIG. 7B) from the one end of the first opening to one end (e.g., the other end 442a" of one second opening in FIG. 7A) of both ends of one second opening (e.g., one second opening 442a of FIG. 6A) of the plurality of second openings overlapping the first opening, the one end of the second opening being near to the another end of the first opening.

According to an embodiment, a length (e.g., d3 of FIG. 7B) of each of the plurality of first openings in the third direction may be substantially equal to a length (e.g., d5 of FIG. 7B) of each of the plurality of second openings in the third direction.

According to an embodiment, the first layer may further include a first bridge (e.g., one first bridge 441b of FIG. 6A) contacting the one end of the first opening, and the second layer may further include a second bridge (e.g., one second bridge 442b of FIG. 6A) contacting the one end of the second opening. According to an embodiment, a distance (e.g., s1 in FIG. 7D) from the another end of the first opening to the first bridge may be different from a distance (e.g., s2 in FIG. 7D) from another end of the one second opening (e.g., another end 442a" of one second opening) to the second bridge.

According to an embodiment, a distance (e.g., d3 in FIG. 7B) from the one end of the one second opening to the first bridge is substantially equal to a distance (e.g., d5 in FIG. 7B) from the another end of the one second opening to the first bridge.

According to an embodiment, a thickness (e.g., d7 in FIG. 10) of the flexible region is less than or equal to a thickness (e.g., d8 in FIG. 10) of the rigid regions.

According to an embodiment, the electronic device may further include an adhesive member (e.g., an adhesive member 640 of FIG. 6A) disposed between the first layer and the second layer in a region corresponding to the rigid regions among the flexible region and the rigid regions According to an embodiment, the support plate further includes a continuous surface (e.g., a planar plate 500 of FIG. 5B) in the planar region. According to an embodiment, the rigid regions and the flexible region disposed in a region correspond to the deformable region.

According to an embodiment, the electronic device may further include at least one support bar (e.g., at least one support bar 1100 of FIG. 11A) supporting the support plate. According to an embodiment, when viewing the display from above, the at least one support bar may overlap each of the rigid regions.

According to an embodiment, the electronic device may further include at least one gear head (e.g., a gear head 620 of FIG. 6A) disposed on both peripheries of the support plate extending in a direction parallel to the first direction in the rigid regions), and a guide gear (e.g., a guide gear 630 of FIG. 6A) engaged with the at least one gear head and guiding movement of the display.

According to an embodiment, the support plate may further include a first reinforcement layer (e.g., a first reinforcement layer 1110 of FIG. 11A) disposed between the first layer and the second layer.

According to an embodiment, the support plate may further include at least one of carbon fiber reinforced polymer (CFRP), glass fiber reinforced plastics (GFRP), or stainless used steel (SUS).

According to an embodiment, the support plate may further include a third layer (e.g., a third layer 743 of FIG. 7E) disposed on the second layer and including a plurality of third openings partially overlapping each of the plurality of first openings and partially overlapping each of the plurality of second openings in the flexible region. According to an embodiment, the distance from the one end to the another end of the one first opening of the plurality of first openings facing the third direction may be different from a distance (e.g., d6 of FIG. 7E) from the one end of the one first opening to one end of both ends of one third opening (e.g., one third opening 743a of FIG. 7E) of the plurality of third openings overlapping the one first opening, the one end (e.g., one end 743c' of the third opening disposed in a third direction (e.g., +x direction) with respect to one third opening 743a of FIG. 7E) of the one third opening being near to the another end of the first opening.

According to an embodiment, the first layer may further include a first bridge contacting the one end of the one first opening, the second layer may further include a second bridge contacting the one end of the one second opening, and the third layer may further include a third bridge (e.g., one third bridge 743b of FIG. 7E) contacting the one end of the one third opening. According to an embodiment, a distance (e.g., s3 in FIG. 7E) from the first bridge to the second bridge may be substantially equal to a distance (e.g., s4 in FIG. 7E) from the second bridge to the third bridge and may be substantially equal to a distance (e.g., s5 in FIG. 7E) from the third bridge to the another end of the one first opening facing the one end of the one first opening According to an embodiment, the electronic device may further include an adhesive member disposed between the second layer and the third layer in a region corresponding to the rigid regions among the flexible region and the rigid regions.

According to an embodiment, the support plate may further include a second reinforcement layer (e.g., a second reinforcement layer 1120 of FIG. 11B) disposed between the second layer and the third layer.

According to an embodiment, an electronic device may include a first housing, a second housing coupled to the first housing so as to be slidable with respect to the first housing in a first direction and a second direction opposite to the first direction, a display including a planar region disposed on the second housing and a deformable region that contacts the planar region and is exposed to an outside as the second housing moves in the first direction or disposed in the first housing as the second housing moves in the second direction, a support plate configured to support the display, at least one gear head disposed on both peripheries of the support plate extending in a direction parallel to the first direction, and a guide gear guiding a movement of the display and rotating meshed with the at least one gear. According to an embodiment, the support plate includes rigid regions, a flexible region disposed between the rigid regions and including a plurality of openings spaced apart from each other and having a length in a third direction perpendicular to the first direction, a first layer including a plurality of first openings extending in the third direction and a plurality of first bridges separating each of the plurality of first openings in the flexible region, and a second layer disposed on the first layer and including a plurality of second openings partially overlapping each of the plurality of first openings and a plurality of second bridges separating each of the plurality of second openings in the flexible region. According to an embodiment, a distance from one end of one first opening of the plurality of first openings facing the third direction to one first bridge of the plurality of first bridges in contact with another end of the one first opening may be different from a distance from the one end of the one first opening to a second bridge of the plurality of second bridges, the second bridge being near to the another end of the first opening.

According to an embodiment, a length of each of the plurality of first openings in the third direction may be substantially equal to a length of each of the plurality of second openings in the third direction.

According to an embodiment, a distance from one end of one second opening of the plurality of second openings overlapping the one first opening to the first bridge may be substantially equal to a distance from another end of the one second opening to the first bridge.

According to an embodiment, the electronic device may further include at least one support bar supporting the support plate. According to an embodiment, when viewing the display from above, the at least one support bar may overlap each of the rigid regions.

According to an embodiment, the support plate may further include a third layer disposed on the second layer and including a plurality of third openings partially overlapping each of the plurality of first openings and partially overlapping each of the plurality of second openings, in the flexible region. According to an embodiment, the distance from the one end to the another end of the one first opening of the plurality of first openings facing the third direction may be different from a distance from the one end of the one first opening to one end of both ends of one third opening of the plurality of third openings overlapping the one first opening, the one end of the one third opening being near to the another end of the first opening.

According to an embodiment, the third layer may further include a third bridge in contact with the one end of the one third opening. According to an embodiment, a distance from the first bridge to the second bridge may be substantially equal to a distance from the second bridge to the third bridge, and may be substantially equal to a distance from the third bridge to the other end facing one end of the one first opening.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first housing;
   a second housing coupled to the first housing so as to be slidable with respect to the first housing in a first direction and a second direction opposite to the first direction;
   a display including a planar region disposed on the second housing and a deformable region that contacts the planar region, wherein the deformable region is exposed to an outside as the second housing moves in the first direction or disposed in the first housing as the second housing moves in the second direction; and
   a support plate configured to support the display;
   wherein the support plate includes:
      rigid regions;
      a flexible region disposed between the rigid regions, the flexible region including a plurality of openings spaced apart from each other and having a length in a third direction perpendicular to the first direction;
      a first layer including a plurality of first openings extending in the third direction in the flexible region; and
      a second layer disposed on the first layer and including a plurality of second openings partially overlapping each of the plurality of first openings in the flexible region;
   wherein a distance from one end to another end of one first opening of the plurality of first openings facing the third direction is different from a distance from the one end of the one first opening to one end of both ends of one second opening of the plurality of second openings overlapping the one first opening, the one end of the one second opening being near to the another end of the first opening.

2. The electronic device of claim 1, wherein a length of each of the plurality of first openings in the third direction is substantially equal to a length of each of the plurality of second openings in the third direction.

3. The electronic device of claim 1, wherein the first layer further includes a first bridge contacting the one end of the one first opening,
   wherein the second layer further includes a second bridge contacting the one end of the one second opening, and
   wherein a distance from the another end of the one first opening to the first bridge is different from a distance from another end of the one second opening to the second bridge.

4. The electronic device of claim 3, wherein a distance from the one end of the one second opening to the first bridge is substantially equal to a distance from the another end of the one second opening to the first bridge.

5. The electronic device of claim 1, wherein a thickness of the flexible region is less than or equal to a thickness of the rigid regions.

6. The electronic device of claim 1, further comprising an adhesive member disposed between the first layer and the second layer in a region corresponding to the rigid regions among the flexible region and the rigid regions.

7. The electronic device of claim 1, wherein the support plate further includes a continuous surface in the planar region, and
wherein the rigid regions and the flexible region disposed in a region correspond to the deformable region.

8. The electronic device of claim 1, further comprising:
at least one support bar supporting the support plate,
wherein, when viewing the display from above, the at least one support bar overlaps each of the rigid regions.

9. The electronic device of claim 1, further comprising:
at least one gear head disposed on both peripheries of the support plate extending in a direction parallel to the first direction in the rigid regions; and
a guide gear meshed with the at least one gear head and guiding a movement of the display.

10. The electronic device of claim 1, wherein the support plate further includes a first reinforcement layer disposed between the first layer and the second layer.

11. The electronic device of claim 1, wherein the support plate further includes at least one of carbon fiber reinforced polymer (polymer (CFRP), glass fiber reinforced plastics (GFRP), or stainless used steel (SUS).

12. The electronic device of claim 1, wherein the support plate further includes a third layer disposed on the second layer and including a plurality of third openings partially overlapping each of the plurality of first openings and partially overlapping each of the plurality of second openings in the flexible region, and
wherein the distance from the one end to the another end of the one first opening of the plurality of first openings facing the third direction is different from a distance from the one end of the one first opening to one end of both ends of one third opening of the plurality of third openings overlapping the one first opening, the one end of the one third opening being near to the another end of the first opening.

13. The electronic device of claim 12, wherein the first layer further includes a first bridge contacting the one end of the one first opening,
the second layer further includes a second bridge contacting the one end of the one second opening,
the third layer further includes a third bridge contacting the one end of the one third opening, and
a distance from the first bridge to the second bridge is substantially equal to a distance from the second bridge to the third bridge and is substantially equal to a distance from the third bridge to the another end of the one first opening facing the one end of the one first opening.

14. The electronic device of claim 12, further comprising an adhesive member disposed between the second layer and the third layer in a region corresponding to the rigid regions among the flexible region and the rigid regions.

15. The electronic device of claim 12, wherein the support plate further includes a second reinforcement layer disposed between the second layer and the third layer.

16. An electronic device comprising:
a first housing;
a second housing coupled to the first housing so as to be slidable with respect to the first housing in a first direction and a second direction opposite to the first direction;
a display including a planar region disposed on the second housing and a deformable region that contacts the planar region, wherein the deformable region is exposed to an outside as the second housing moves in the first direction and is disposed in the first housing as the second housing moves in the second direction;
a support plate configured to support the display;
at least one gear head disposed on both peripheries of the support plate extending in a direction parallel to the first direction; and
a guide gear guiding a movement of the display and rotating meshed with the at least one gear;
wherein the support plate includes:
rigid regions;
a flexible region disposed between the rigid regions, the flexible region including a plurality of openings spaced apart from each other and having a length in a third direction perpendicular to the first direction;
a first layer including a plurality of first openings extending in the third direction and a plurality of first bridges separating each of the plurality of first openings in the flexible region; and
a second layer disposed on the first layer and including a plurality of second openings partially overlapping each of the plurality of first openings and a plurality of second bridges separating each of the plurality of second openings in the flexible region; and
wherein a distance from one end of one first opening of the plurality of first openings facing the third direction to one first bridge of the plurality of first bridges in contact with another end of the one first opening is different from a distance from the one end of the one first opening to a second bridge of the plurality of second bridges, the second bridge being near to the another end of the first opening.

17. The electronic device of claim 16, wherein a length of each of the plurality of first openings in the third direction is substantially equal to a length of each of the plurality of second openings in the third direction.

18. The electronic device of claim 16, wherein a distance from one end of one second opening of the plurality of second openings overlapping the one first opening to the first bridge is substantially equal to a distance from another end of the one second opening to the first bridge.

19. The electronic device of claim 16, further comprising:
at least one support bar supporting the support plate,
wherein, when viewing the display from above, the at least one support bar overlaps each of the rigid regions.

20. The electronic device of claim 16, wherein the support plate further includes a third layer disposed on the second layer and including a plurality of third openings partially overlapping each of the plurality of first openings and partially overlapping each of the plurality of second openings, in the flexible region, and
wherein the distance from the one end to the another end of the one first opening of the plurality of first openings facing the third direction is different from a distance from the one end of the one first opening to one end of both ends of one third opening of the plurality of third openings overlapping the one first opening, the one end of the one third opening being near to the another end of the first opening.

\* \* \* \* \*